(12) United States Patent
Jones et al.

(10) Patent No.: US 8,921,477 B2
(45) Date of Patent: Dec. 30, 2014

(54) CONVENTIONAL LATEX / NANOLATEX BLENDS

(75) Inventors: Frank N. Jones, West Palm Beach, FL (US); Ravi G. Joshi, Springfield, NJ (US); Theodore Provder, Solon, OH (US)

(73) Assignee: Eastern Michigan University, Ypsilanti, MI (US)

( * ) Notice: Subject to any disclaimer, the term of this patent is extended or adjusted under 35 U.S.C. 154(b) by 1119 days.

(21) Appl. No.: 12/578,442

(22) Filed: Oct. 13, 2009

(65) Prior Publication Data

US 2010/0093913 A1    Apr. 15, 2010

Related U.S. Application Data

(60) Provisional application No. 61/104,812, filed on Oct. 13, 2008, provisional application No. 61/163,352, filed on Mar. 25, 2009.

(51) Int. Cl.
| | | |
|---|---|---|
| *C08F 220/68* | (2006.01) | |
| *C08F 220/06* | (2006.01) | |
| *C08L 13/02* | (2006.01) | |
| *C08L 21/02* | (2006.01) | |
| *C09D 133/06* | (2006.01) | |
| *C09D 5/02* | (2006.01) | |
| *C08L 33/02* | (2006.01) | |
| *C08L 35/02* | (2006.01) | |

(52) U.S. Cl.
CPC ............... *C09D 5/02* (2013.01); *C09D 133/06* (2013.01); *C08L 2205/22* (2013.01); *C08L 33/02* (2013.01); *C08L 35/02* (2013.01)
USPC ........... 524/539; 524/201; 524/500; 524/515; 524/525; 524/526; 524/548; 524/804; 524/846; 428/327

(58) Field of Classification Search
USPC .......... 428/327; 524/201, 500, 515, 525, 526, 524/539, 548, 804, 846
See application file for complete search history.

(56) References Cited

U.S. PATENT DOCUMENTS

| | | | | |
|---|---|---|---|---|
| 4,385,157 A | * | 5/1983 | Auclair et al. ................ | 525/316 |
| 4,539,361 A | * | 9/1985 | Siol et al. ...................... | 524/458 |
| 5,977,254 A | * | 11/1999 | McKee et al. .................. | 525/64 |
| 2006/0229405 A1 | * | 10/2006 | Westerman et al. .......... | 524/501 |

FOREIGN PATENT DOCUMENTS

WO    WO 02070615 A1 *  9/2002

OTHER PUBLICATIONS

Brandrup, J. Immergut et al, "Polymer Handbook", 2005, John Wiley & Sons, 4th edition, p. 193-219.*

* cited by examiner

*Primary Examiner* — Ling Choi
*Assistant Examiner* — David L Miller
(74) *Attorney, Agent, or Firm* — Carrier Blackman & Associates, P.C.; William D. Blackman; Anne G. Sabourin

(57) ABSTRACT

Nanolatexes comprising functional monomers and methods for making nanolatexes. Compositions comprising between about 3:97 and 90:10 (w/w) nanolatex particles to conventional latex particles. Because of the particle size differences between the conventional and nanolatexes, the nanolatexes may distribute themselves advantageously amongst the conventional latexes during coalescence, resulting in films having unexpected properties. In particular, when the average particle size of the conventional latex is about six times larger than the average particle size of the nanolatex, a composition comprising a ratio of 1 conventional latex particle for every 25 nanolatex particles results in unexpectedly strong (large Young's modulus) and smooth (high specular gloss) films.

28 Claims, 10 Drawing Sheets

CONVENTIONAL LATEX / NANOLATEX BLENDS

CROSS REFERENCE TO RELATED APPLICATIONS

This application claims the benefit of priority to U.S. Provisional Patent Application No. 61/104,812 filed Oct. 13, 2008 and U.S. Provisional Patent Application No. 61/163,352 filed Mar. 25, 2009, both of which are incorporated herein by reference in their entirety.

FIELD OF THE INVENTION

Latexes are dispersions of polymers in water. Natural latexes are produced by plants, notably by the rubber tree. Synthetic latexes are typically synthesized using an emulsion polymerization process, whereby one or more monomer species is added to an aqueous surfactant mixture, in the presence of an initiator, to form a dispersion of finely divided polymer particles, e.g. a latex. Most latexes are stabilized by surfactants. The surfactants used in the process contribute to stability, and additional stabilizing structures may be may be formed during the emulsion polymerization process or added later. The most commonly used dispersing medium for latexes is water, however, other volatile organic solvents, stabilizers, and plasticizers may be present. In formulating paints, it is common to add such solvents, stabilizers, and plasticizers as well as pigments and other additives, as detailed below. When latexes are deposited on a surface, the water and other volatile species evaporate, allowing the polymer particles to coalesce and form a polymer film.

One classical model of latex film formation describes the film formation in three steps: (1) evaporation of volatiles (solvent), (2) particle deformation to a continuous film (coalescence), and (3) molecular interpenetration to knit the particles together (fusion). (See, Winnik, "The formation and properties of latex films," *Emulsion Polymerization and Emulsion Polymers* (1997).) The three steps need not be distinct, and they may take place concurrently as the film forms. According to this classical model, varying the water and solvent composition of the latexes and size of the polymer particles will vary the properties of the resultant film. Additionally, the degree to which the polymers interpenetrate and bind together can be influenced by the inclusion of crosslinkers that bind separate polymer chains together to form a vast network of linked molecules. While crosslinkers can increase the hardness and durability of films of otherwise similar composition, the crosslinkers can increase the cost of producing a latex and the crosslinkers may make the tasks of formulating and applying paints from the latexes more difficult.

Latexes find widespread use in coatings, films, paints, rubbers, and adhesives. Because latex-based materials do not require large quantities of volatile organic solvents, in contrast to oil-based paints, they are environmentally-friendly when compared to other conventional paints. Additionally, it is easy to include other water soluble or water dispersible components, including, but not limited to, thickeners, antimicrobials, UV screeners, biocidals, filaments, pigments, dyes, fragrances, and texturants (e.g., sand). By adding these additional components, it is possible to adjust the strength, color, smell, or other properties of the latex blends and of the final films.

Architectural paints are among the most popular end uses for synthetic latexes, amounting to annual sales of more than $8 billion in the United States (2007—Census Bureau Data). Despite the environmental benefits of latex paints, however, large sectors of the coatings industry do not use latex paints extensively because latex films typically cannot achieve the strength, hardness, and gloss of enamels. Accordingly, latex paints do not see widespread use in the automotive or marine industries. Similarly, latex paints have not been widely adopted as protective coatings for metal structures which are exposed to the elements (bridges, refineries, ships, storage tanks, watertowers, etc.)

SUMMARY

The invention provides, among other things, a composition comprising between about 3:97 and 90:10 (w/w) nanolatex particles to conventional latex particles, the nanolatex particles having an average particle size of 7-45 nm, and the conventional latex particles having an average particle size of 60-800 nm. The nanolatexes, or the conventional latexes, or both may comprise at least one of n-butyl acrylate (nBA), n-butyl methacrylate (nBMA), methacrylic acid (MAA), methyl methacrylate (MMA), acrylic acid (AA), ethyl acrylate, 2-ethylhexyl methacrylate, esters of acrylic acid, esters of methacrylic acids, vinyl esters, styrene, methyl styrenes, acrylonitrile, butadiene, and isoprene. The nanolatex, or the conventional latex, or both may comprise additional monomers that promote crosslinking between polymer chains. The conventional latexes and nanolatexes may have a $T_g$ between about $-70°$ C. and $120°$ C. The compositions may be incorporated into latex blends which are used to form films or coatings, in particular paints and adhesives.

The invention additionally provides, among other things, a film comprising n-butyl acrylate (nBA), n-butyl methacrylate (nBMA), and methacrylic acid (MAA), having a Young's modulus greater than 150 Mpa, typically greater than 200 Mpa. Films of the invention may have a specular gloss greater than 80 at 60°.

The invention additionally provides, among other things, a composition comprising an 85/15 (wt/wt) blend of conventional latex and nanolatex, the conventional latex comprising nBA, nBMA, and MAA monomers, and having a $T_g$ between about 20° C. and 35° C.; the nanolatex comprising nBA, nBMA, and MAA monomers, and having a $T_g$ between about 0° C. and 15° C. The nanolatex, or the conventional latex, or both may comprise additional monomers that promote crosslinking between polymer chains. The composition may be incorporated into latex blends which may be used to form films having a Young's modulus greater than 150 Mpa.

The invention additionally provides, among other things, a method of making a coating composition comprising mixing a conventional latex having an average particle size of 60-800 nm with a nanolatex having an average particle size of 7-45 nm, wherein the ratio of conventional latex to the nanolatex is between about 3:97 and 90:10 (w/w). The nanolatexes, or the conventional latexes, or both comprise at least one of n-butyl acrylate (nBA), n-butyl methacrylate (nBMA), methacrylic acid (MAA), methyl methacrylate (MMA), acrylic acid (AA), ethyl acrylate, 2-ethylhexyl methacrylate, esters of acrylic acid, esters of methacrylic acids, vinyl esters, styrene, methyl styrenes, acrylonitrile, butadiene, and isoprene. The nanolatex, or the conventional latex, or both may comprise additional monomers that promote crosslinking between polymer chains. The conventional latexes and nanolatexes may have a $T_g$ between about $-70°$ C. and $120°$ C. Other aspects of the invention will become apparent by consideration of the detailed description and accompanying drawings.

The invention additionally provides, among other things, a nanolatex comprising functional monomers capable of crosslinking, the nanolatex particles having an average diameter of 5-60 nm, and a monomer to surfactant weight ratio greater than 4 to 1. Typically, the functional monomers are selected from the group consisting of 1-3-butylene glycol dimethacrylate (BGDMA), ethylene glycol diacrylate, ethylene glycol dimethacrylate, propylene glycol diacrylate, propylene glycol dimethacrylate, hexanediol diacrylate, hexanediol dimethacrylate, divinyl benzene, glycidyl methacrylate (GMA), acetoacetoxyethyl methacrylate (AAEMA), diacetone acrylamide (DAA), acrylic acid, methacrylic acid, hydroxyethyl acrylate, hydroxypropyl acrylate, hydroxyethyl methacrylate, and hydroxypropyl methacrylate. The nanolatex may comprise one or more additional monomers selected from the group consisting of n-butyl acrylate (nBA), n-butyl methacrylate (nBMA), methacrylic acid (MAA), methyl methacrylate (MMA), acrylic acid (AA), ethyl acrylate, 2-ethylhexyl methacrylate, 2-ethylhexyl acrylate, and styrenes.

The invention additionally provides, among other things, a method of making a nanolatex comprising mixing a monomer and a surfactant at a pH between 8 and 11 to form a monomer mixture, initiating a polymerization in the monomer mixture with an initiator, adding additional amounts of the monomer, and forming a nanolatex having an average particle size of 5-60 nm. The monomer may be selected from the group consisting of n-butyl acrylate (nBA), n-butyl methacrylate (nBMA), methacrylic acid (MAA), methyl methacrylate (MMA), acrylic acid (AA), ethyl acrylate, 2-ethylhexyl methacrylate, 2-ethylhexyl acrylate, and styrene. The nanolatex may additionally comprise one or more co-monomers. Typically the ratio of monomer weight to surfactant weight is 4:1 or greater.

The invention additionally provides, among other things, a method of making a nanolatex comprising mixing a first monomer, a second monomer, and a surfactant at a pH between 8 and 11 to form a monomer mixture, initiating a co-polymerization in the monomer mixture with an initiator, adding additional amounts of the first monomer and the second monomer and forming a nanolatex having an average particle size of 5-60 nm. The first monomer, or the second monomer, or both the first and second monomers may be selected from the group consisting of n-butyl acrylate (nBA), n-butyl methacrylate (nBMA), methacrylic acid (MAA), methyl methacrylate (MMA), acrylic acid (AA), ethyl acrylate, 2-ethylhexyl methacrylate, 2-ethylhexyl acrylate, and styrene. The second monomer may be a functional monomer selected from the group consisting of 1-3-butylene glycol dimethacrylate (BGDMA), ethylene glycol diacrylate, ethylene glycol dimethacrylate, propylene glycol diacrylate, propylene glycol dimethacrylate, hexanediol diacrylate, hexanediol dimethacrylate, divinyl benzene, glycidyl methacrylate (GMA), acetoacetoxyethyl methacrylate (AAEMA), diacetone acrylamide (DAA), acrylic acid, methacrylic acid, hydroxyethyl acrylate, hydroxypropyl acrylate, hydroxylethyl methacrylate, and hydroxypropyl methacrylate. Typically the ratio of first and second monomer weight to surfactant weight is 4:1 or greater.

DETAILED DESCRIPTION

Figure 1:
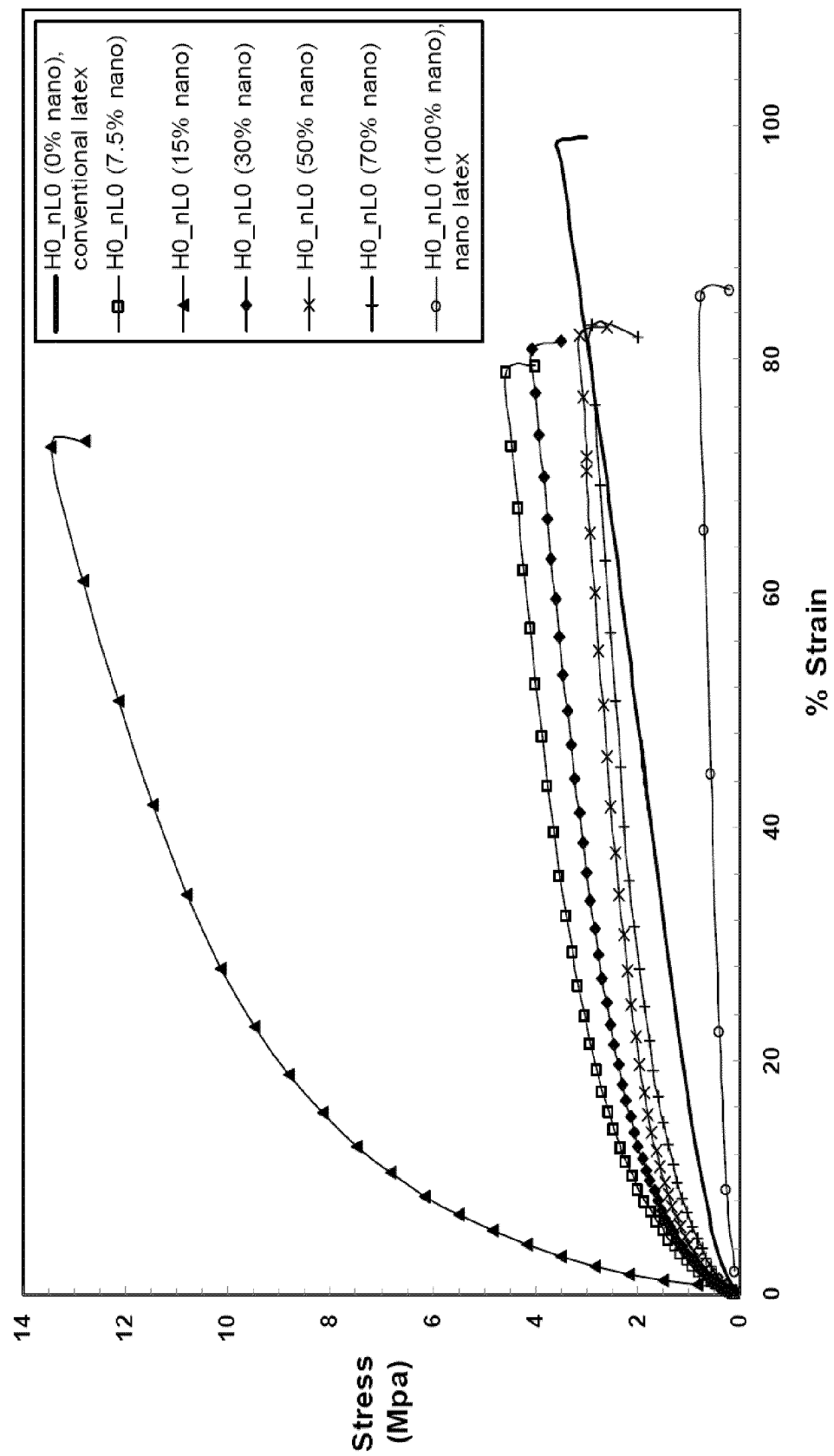
FIG. 1 shows stress/strain curves for the nBA/nBMA/MAA conventional latex/nanolatex blends (without crosslinking) described in EXAMPLE 3.
Figure 2:
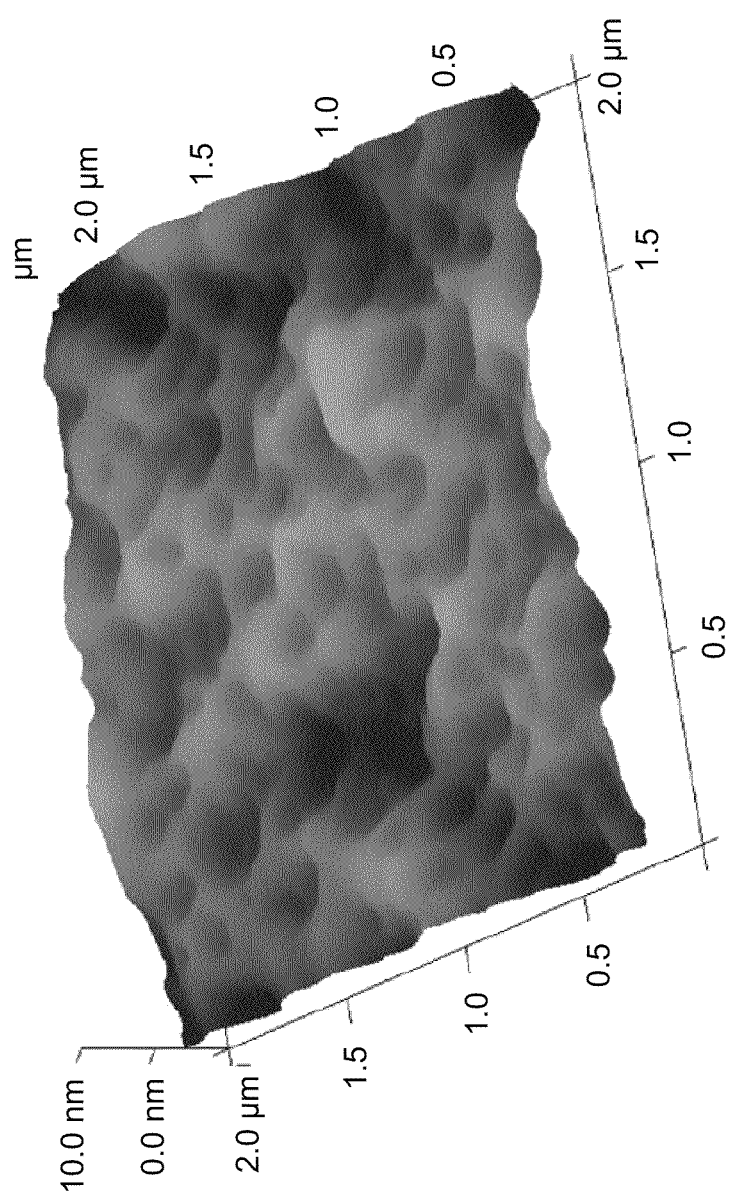
FIG. 2 shows a (tapping mode) atomic force microscopy (AFM) image of a film created from a conventional nBA/nBMA/MAA latex with an average particle size of 126 nm.

The invention provides methods for making nanolatexes and nanolatexes comprising functional monomers that are capable of cross-linking. The nanolatexes may be used alone, combined with other components such as stabilizers or surfactants, or combined with conventional latexes to produce conventional latex/nanolatex blends which have unexpected properties. The nanolatexes, typically from 5-60 nm in diameter, are prepared via microemulsion polymerization under mildly basic conditions. The process typically involves the preparation of a seed latex of monomer and surfactant followed by the slow addition of additional monomer once the polymerization process has been initiated. In particular, the methods of the invention allow for the preparation of a seed latex with more than one monomer, which may include functional monomers that allow for cross-linking, as well as the facile addition of additional monomers to produce usable quantities of nanolatexes. The nanolatexes of the invention may have greater than a 20 to 1 ratio of total monomer weight to surfactant weight, typically greater than a 10 to 1 ratio, most typically greater than a 4 to 1 ratio. The nanolatexes of the invention have a $T_g$ between about −70° C. and 120° C.

The method of making a nanolatex may use only one type of monomer, however, more typically two, or three, or four, or five, or six, or seven, or eight, or more additional monomers may be used to make the nanolatexes. Monomers suitable for use with the process include, but are not limited to, butyl acrylates (BA), butyl methacrylates (BMA), methacrylic acids (MAA), methyl methacrylate (MMA), acrylic acids (AA), ethyl acrylates, 2-ethylhexyl methacrylate, 2-ethylhexyl acrylate, esters of acrylic acid, esters of methacrylic acids, vinyl esters, styrene, methyl styrenes, acrylonitrile, butadiene, and isoprene. The methyl styrenes include methyl 2-, 3-, 4-, and alpha-methyl styrenes.

The method may also be used to create nanolatexes comprising functional monomers, which may facilitate crosslinking, including pre-coalescence and post-coalescence crosslinking. Functional monomers suitable for use with the method of the invention include, but are not limited to, 1-3-butylene glycol dimethacrylate (BGDMA), ethylene glycol diacrylate, ethylene glycol dimethacrylate, propylene glycol diacrylate, propylene glycol dimethacrylate, hexanediol diacrylate, hexanediol dimethacrylate, divinyl benzene, glycidyl methacrylate (GMA), acetoacetoxyethyl methacrylate (AAEMA), diacetone acrylamide (DAA), acrylic acid, methacrylic acid, hydroxyethyl acrylate, hydroxypropyl acrylate, hydroxylethyl methacrylate, and hydroxypropyl methacrylate.

Examples of surfactants suitable for making nanolatexes of the invention, or including in compositions comprising nanolatexes of the invention, include commonly used cationic surfactants such as dodecyltrimethylammonium bromide (DTAB), or commonly used nonionic surfactants such as nonylphenol polyethoxyethanol (NP), or commonly used anionic surfactants such as sodium dodecyl sulfate (SDS), as well as different combinations of anionic, cationic, and nonionic surfactants. Examples of initiators suitable for making nanolatexes of the invention include, but are not limited to, ammonium persulfate (APS), potassium persulfate (KPS), sodium persulfate, or water-soluble azo initiators. Examples of activators suitable for making nanolatexes of the invention, or including in compositions comprising nanolatexes of the invention include, but not limited to, persulfate/sodium bisulfite/$Fe^{++}$, hydrogen peroxide/sodium bisulfite/$Fe^{++}$, persulfate/formpon/$Fe^{++}$, ethylenediamine tetraacetate, or ammonium persulfate/tetramethylethylenediamine.

The invention also provides for compositions comprising between about 3:97 and 90:10 (w/w) nanolatex particles to conventional latex particles. (References to w/w are to be understood as weight ratios of the solid polymers in the respective latexes, not the weight ratios of the entire latex.) Because of the particle size differences between the conventional and nanolatexes, the nanolatexes may distribute themselves advantageously amongst the conventional latexes during coalescence, resulting in films having unexpected properties. In particular, when the average particle size of the conventional latex is about six times larger than the average particle size of the nanolatex, a composition comprising a ratio of 1 conventional latex particle for every 25 nanolatex particles results in unexpectedly strong (large Young's modulus) and smooth (high specular gloss) films. (However, compositions of the invention may be prepared wherein the ratio of the average particle size of the conventional latex to the average particle size of the nanolatex is between about 3:1 to about 20:1.) More particularly, the invention provides for a composition comprising an approximately 85/15 (wt/wt) blend of conventional latex and nanolatex; the conventional latex comprising nBA, nBMA, and MAA monomers, and having a $T_g$ between about 20° C. and 35° C.; the nanolatex comprising nBA, nBMA, and MAA monomers, and having a $T_g$ between about 0° C. and 15° C.

The average particle size (diameter) of conventional latexes is smaller than 10 μm, typically smaller than 1 μm, more typically smaller than 500 nm. The average particle size of conventional latexes is larger than 60 nm, typically larger than 100 nm, more typically larger than 200 nm. Average particle size typically refers to a result measured by a device specific for the purpose, such as the particle size analyzers sold by Brookhaven Instruments Corporation, Holtsville, N.Y. Other methods of analyzing the particle size of a latex are known to those of skill in the art. When an average particle size is quoted, it is to be understood that the composition may contain a distribution of particles larger and smaller than the average particle size. The distribution is typically Gaussian with a sigma of ±30%, more typically the distribution is Gaussian with a sigma of ±15%.

Single monomer nanolatexes suitable for use in the nanolatex/conventional latex blends of the invention have only recently been disclosed. For example, Ming et al. disclosed protocols for forming high solids content nanolatexes comprising styrene, butyl methacrylate, butyl acrylate, methyl methacrylate, or methyl acrylate using a modified microemulsion process. Ming et al., "High solids-content nanosize polymer latexes made by microemulsion polymerization," *Macromolecular Chemistry and Physics*, vol. 199, 1075-1079 (1998), incorporated herein by reference in its entirety.

More suitable for use with the nanolatex/conventional latex blends of the invention, improved nanolatexes may be fabricated with the nanolatex synthetic methods described herein, making it possible to synthesize nanolatexes comprising partially water-soluble monomers, such as n-BMA and n-BA, as well as copolymers incorporating functional monomers. The improved synthetic methods are different from the methods of Ming in at least five ways: (1) pH of water in seed microemulsion, from neutral (7.0 at 25° C.) to slightly alkaline (9-10 at 25° C.); (2) equal partitioning of co-surfactant, thereby allowing portions of the co-surfactant to be added at different stages of the synthesis; (3) amount of monomer mixture in seed microemulsion; (4) monomer mixture addition time and monomer droplet size, and (5) amount of initiator/activator system to produce stable pre-coalescence or post-coalescence crosslinked nanoparticle size latexes. Additionally, using the methods of the invention, a crosslinkable monomer may be incorporated into the monomer mixture, or the crosslinkable polymer may be added at the end of the monomer mixture addition step.

Using these advanced techniques, it is possible to produce nanolatexes with average particle sizes between 10 and 30 nm without the need for excessive quantities of surfactant. The average particle size (diameter) of the nanolatexes is smaller than 45 nm, typically smaller than 30 nm, more typically smaller than 25 nm. The average particle size of the nanolatexes is larger than 7 nm, typically larger than 10 nm, and may be larger than 15 nm.

The conventional latexes may be prepared from a variety of monomers using techniques known in the art of emulsion polymerization. In particular, the conventional latexes may comprise one or more of the following monomers: n-butyl acrylate (nBA), n-butyl methacrylate (nBMA), methacrylic acid (MAA), methyl methacrylate (MMA), acrylic acid (AA), ethyl acrylate, 2-ethylhexyl methacrylate, esters of acrylic acid, esters of methacrylic acids, vinyl esters, styrene, methyl styrenes, acrylonitrile, butadiene, and isoprene. The conventional latexes may additionally comprise one or more functional monomers which facilitate cross-linking, as is described below. Other monomers may be incorporated into compositions of the invention using methods known to those of skill in the art.

The nanolatexes may also comprise n-butyl acrylate (nBA), n-butyl methacrylate (nBMA), methacrylic acid (MAA), methyl methacrylate (MMA), acrylic acid (AA), ethyl acrylate, 2-ethylhexyl methacrylate, esters of acrylic acid, esters of methacrylic acids, vinyl esters, styrene, methyl styrenes, acrylonitrile, butadiene, and isoprene.

In some embodiments, the compositions additionally comprise crosslinkers which bind adjacent polymer chains to produce interconnected networks of polymers. In some embodiments crosslinkers are added during synthesis of the latex, leading to crosslinked particles within the latex particles (pre-coalescence crosslinking). For pre-coalescence latexes, the crosslinker may be added to the monomer mixture at levels up to 5 wt. % of the total monomer weight, however crosslinkers added at 1 to 3 wt. % or lower are more typical. The nanolatexes of invention comprising pre-coalescence latexes are not microgels, however, as they are independently capable of coalescing to form a film. Pre-coalescence crosslinkers include, but need not be limited to, 1-3-butylene glycol dimethacrylate (BGDMA), ethylene glycol diacrylate, ethylene glycol dimethacrylate, propylene glycol diacrylate, propylene glycol dimethacrylate, hexanediol diacrylate, hexanediol dimethacrylate, and divinyl benzene.

In other embodiments crosslinkable monomers are incorporated into the latex polymer with the intention of effecting crosslinking as the latex is forming a film (post-coalescence crosslinking). In post-coalescence latexes, an additional monomer, which provides active sites for the crosslinker, is added at levels up to about 10 wt. % of the total monomer weight. In post-coalescence crosslinking, a cross-linking agent is added to the mixture prior to casting the latex film. The crosslinker then crosslinks to the active sites on the polymer chains as the film dries. Monomers providing active sites for post-coalescence crosslinking may include glycidyl methacrylate (GMA), acetoacetoxyethyl methacrylate (AAEMA), diacetone acrylamide (DAA), acrylic acid, methacrylic acid, hydroxyethyl acrylate, hydroxypropyl acrylate, hydroxyethyl methacrylate, and hydroxypropyl methacrylate.

Crosslinkers suitable for effecting crosslinking between the functional monomers with reactive groups depend on the specific reactive group incorporated into the latex polymer. For example, dihydrazides, including adipic dihydrazide, are suitable for crosslinking polymers that contain diacetone acrylamide (DAA). Other suitable combinations include polymers containing carboxyl groups crosslinked with polyaziridines or polycarbodiimides; polymers containing glycidyl methacrylate (GMA) crosslinked with polyamines, polyacids, polythiols, or polyanhydrides; and polymers containing hydroxyl groups crosslinked with melamine resins, urea resins, or blocked isocyanate resins. Other combinations will be known by those skilled in the art.

In some embodiments, the conventional latex/nanolatex mixture may include precoalescence crosslinked conventional latexes, precoalescence crosslinked nanolatexes, or both. In other embodiments, the conventional latexes are capable of post coalescence crosslinking while the nanolatexes are not. In still other embodiments the conventional latexes are not capable of post-coalescence crosslinking while the nanolatexes are.

Using the techniques of the invention it is possible to produce a wide variety of conventional latex/nanolatex blends. In some embodiments, the conventional latexes and nanolatexes will have similar monomer compositions, however they may have different transition glass temperatures ($T_g$). In other embodiments, the conventional latexes and nanolatexes may have different monomer compositions. The $T_g$s of both the conventional latexes and nanolatexes are between about $-70°$ C. and $120°$ C. ° C., typically between about $-40°$ C. and $50°$ C. In some embodiments, the conventional latexes have a $T_g$ between about $5°$ C. and $50°$ C., while the nanolatexes have a $T_g$ between about $-15°$ C. and $30°$ C. In other embodiments, the conventional latexes have a $T_g$ between about $-10°$ C. and $15°$ C., while the nanolatexes have a $T_g$ between about $15°$ C. and $40°$ C.

While the ratio of conventional latex to nanolatex may be varied infinitely, compositions of the invention exhibit valuable and unexpected properties when the ratio of nanolatex particles to conventional latex particles is between about 3:97 and 90:10 (w/w), typically between about 7:93 and 80:20 (w/w), more typically between about 10:90 and 50:50 (w/w). Data shows the presences of synergies resulting in higher film strengths and surface smoothness when the compositions comprise approximately 25 nanolatex particles for each conventional latex particle when the ratio of the diameter of the nanolatex to the conventional latex is 1:6. In some embodiments that conventional latex and the nanolatex have similar compositions (to promote polymer/polymer compatibility) or similar stabilizers, e.g. surfactant, (to promote stability of the blended latex). Blends of the inventions, however, may be prepared by blending conventional and nanoparticle latexes of different monomer compositions.

We suspect that blends that can achieve excellent surface coverage because the nanolatexes are filling voids between the conventional latex particles, thereby allowing efficient molecular interpenetration as the latex formulation loses its volatiles, while avoiding built-up or voided areas in the surface. Such surface deformities not only reduce the smoothness of the film, but may result in defects within the film which ultimately weaken the film. Evidence for this is the excellent adhesion of the blends. We predict a conventional/nanolatex blend having a 7:1 ratio of particle sizes would display synergistic properties when the ratio of the number of conventional latex particles to nanolatex particles is approximately 1:35, and for a 5:1 ratio of particle sizes, we predict synergistic effects for a blend of approximately 1:15 conventional latex particles to nanolatex particles.

Compositions of the invention are formed by separately synthesizing conventional latexes and nanolatexes and then combining the conventional latexes and nanolatexes to form a composition. Optionally, the conventional latexes and nanolatexes may be cleaned by filtering and washing after synthesis, e.g., with a 200 mesh sieve, however, this is typically unnecessary. The compositions of the invention are easily incorporated into latex blends by suspending the conventional/nanolatex composition in water with mixing. Other stabilizers, including, but not limited to, primary alcohols, such as 1-butanol, 1-pentanol, 1-octanol, etc., may also be incorporated into the latex compositions. The compositions may additionally comprise plasticizers, such as ethylene glycol, propylene glycol, butyl cellosolve, and TEXANOL (Eastman Chemical, Kingsport, Tenn.).

The latex blends may be prepared using any of a number of methods known to those of skill in the art, including mixers, blenders, dispersers, etc. Latex blends comprising compositions of the invention may be formulated into paints, adhesives, and coatings, etc. by adding additional components such as thickeners, surfactants, antimicrobials, biocidals, filaments, pigments, dyes, fragrances, and texturants.

A film according to the invention may be formed by spreading, brushing, rolling, dipping, spraying, or otherwise distributing a latex blend of a composition of the invention on a substrate and allowing the latex blend to coalesce into a film. Typically coalescence involves the evaporation of volatiles contained in the latex blend. The evaporation may happen spontaneously, or it may be accelerated with the application of heat. In some embodiments the coating is baked at $80°$ C. or greater for longer than 15 seconds. (For the purpose of evaluating the film, the latex blends were distributed on smooth aluminum, smooth glass, or smooth TEFLON, and allowed to coalesce at room temperature.) The resultant films, formed from a mixture of conventional latex and nanolatex particles, may exhibit better properties in strength, hardness, gloss, smoothness, rub resistance, or adhesion than the individual conventional latexes or nanolatexes which make up the composition. Films of the invention may have a Young's modulus greater than about 100 MPa, typically greater than about 150 MPa, more typically greater than about 200 MPa. Because the smoothness of a surface typically correlates to the glossiness of the surface, the smoothness may be evaluated by measuring the specular gloss of a film at a predetermined angle, typically 20° or 60°. Films of the invention may have a specular gloss at 60° of greater than about 70, typically greater than about 80.

Because of the superior properties of the films of the invention, it is likely that films of the invention will be used to coat, protect, and color many different materials, especially metals, glass, plastic, wood, particle board, gypsum board, as well as painted wood, metal, plastic, particle board and gypsum board. In some instances, it will be beneficial to coat the substrate with a different coating, e.g., a primer, prior to coating the substrate with latex blends of the invention. For example, compositions of the invention may be incorporated into paints which are used to coat the interior and exterior of houses, buildings, bridges, structures, ships, airplanes, automobiles, trucks, appliances, furniture, and toys. Of course, this list is merely exemplary, and compositions of the invention could be used in most applications in which paint is already used. In particular, because of the exceptional strength and smoothness of the films of the invention, it is expected that compositions of the invention will be incorporated into exterior coatings for metal structures and vehicles—applications that have not seen widespread use of latex paints.

It is to be understood that the invention is not limited in its application to the details of construction and the arrangement of components set forth in the following description. The invention is capable of other embodiments and of being practiced or of being carried out in various ways. Also it is to be understood that the phraseology and terminology used herein is for the purpose of description and should not be regarded as limiting.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any nonclaimed element as essential to the practice of the invention.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

Further, no admission is made that any reference, including any patent or patent document, cited in this specification constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinency of any of the documents cited herein.

EXAMPLES

Example 1

Formation of nBA/nBMA/MAA Nanolatex

A nanolatex, comprising a 21/77/2 ratio of nBA/nBMA/MAA monomers, having a $T_g$=5-10° C. was prepared under a nitrogen atmosphere in a 250 mL, 3-neck flask (Ace Glass, Vineland, N.J.) equipped with a reflux condenser, a thermometer, an addition funnel and a nitrogen gas inlet and outlet. The flask was heated and stirred with a stirring hotplate (Fisher Scientific, Waltham Mass.) using a 25 mm×8 mm magnetic stirrer.

Using the above setup, the nanolatex was prepared in the following steps:

STEP 1: A microemulsion formulation was formed by mixing 0.3 g of a 21/77/2 (wt/wt/wt) mixture of nBA/nBMA/MAA monomers, 1 g of SDS, 0.1 g of 1-pentanol (Sigma-Aldrich, St. Louis, Mo.), 78.7 g of DI water and 10-14 drops of aqueous ammonia (30% in water, Sigma-Aldrich, St. Louis, Mo.). After addition of the ammonia solution, the formulation had a pH of 9-10.

STEP 2: The microemulsion was heated at 40° C. with stirring and purged by bubbling nitrogen through the formulation for 5 minutes.

STEP 3: A solution of 0.0464 g of N,N,N',N'-tetramethylethylenediamine (TMEDA) (Sigma-Aldrich, St. Louis, Mo.) in 5 g of D.I. water (4 mM) was added to the microemulsion via addition funnel, followed by a solution of 0.0912 g of ammonium persulfate in 5 g of water (4 mM), which initiated the polymerization.

STEP 4: An additional 9.7 g 21/77/2 (wt/wt/wt) mixture of nBA/nBMA/MAA monomers (total monomer to surfactant ratio 10.5:1) was added dropwise via addition funnel (~6 drops/min.) into the microemulsion formulation over the course of 90-120 mins. During addition, the temperature of the formulation was maintained at 40+/−1° C., a slow flow of nitrogen was maintained, and the reaction mixture was stirred at a rate of approximately 600 revolutions per minute.

STEP 5: After addition was complete, stirring was continued for another 2-3 hours at 40° C. to essentially complete the conversion of the monomer mixture. In addition, a 50/50 wt/wt solution of 2-amino-2-methyl-1-propanol (in DI water (about 3 mL) was added during stirring.

The resulting nanolatex had an average particle size of 23.2 nm as measured with a BROOKHAVEN 90 PLUS particle size analyzer (Brookhaven Instruments Corporation, Holtsville, N.Y.), and a viscosity of 13 MPa/s, as measured with a Brookfield Viscometer model 2000+ (Brookfield Engineering, Middleboro, Mass.), using spindle #1 at 113 rpm. A transition glass temperature of $T_g$=5° C. was measured for the nanolatex with a TA Instruments Model 2920 modulated differential scanning calorimeter (MDSC) with liquid nitrogen cooling accessory system (LNCS) (TA Instruments, New Castle, Del.). For the $T_g$ measurements of the nanolatexes, the samples were prepared on 50 mm×10 mm×3 mm TEFLON blocks.

Example 2 nBA/nBMA/MAA Nanolatexes Including Functional Monomers

Nanolatexes comprising functional monomers, which allow for crosslinking, were formed using a synthetic method similar to that of EXAMPLE 1. Generally, the nanolatexes were prepared under a nitrogen atmosphere in a 250 mL, 3-neck flask equipped with a reflux condenser, a thermometer, an addition funnel, and a 25 mm×8 mm magnetic stirrer bar. The specific monomer formulations that were used for the different nanolatexes are listed in TABLE 1. The nanosize latexes are coded n for nanosize, I for pre-coalescence or internal, E for post-coalescence or external, L for low $T_g$ and, a number for the weight % of crosslinker or reactive site in the monomer mixture. Thus, for example nIL-2 means pre-coalescence crosslinked latex with 2 wt. % of 1,3-BGDMA and nEL-5 means post-coalescence crosslinked latex with 5 wt. % of DAA.

for another 2-3 hours at reaction temperature to carry the reaction to essentially complete the conversion of monomer. The latex in the flask was then cooled to room temperature (~25° C.), and a 50/50 wt/wt solution of 2-amino-2-methyl-1-propanol in DI water (about 3 mL) was added with continued stirring to adjust the pH to 9.2-9.5.

The pre-coalescence and the post-coalescence nano-crosslinkable-latexes (described in TABLE 1), were made by essentially identical procedures. For the pre-coalescence crosslinked nanolatexes, the functional monomers were included in the monomer mixture recipe. In case of the post-coalescence nanolatexes, crosslinkable monomer was added

TABLE 1

Formulations of nBA/nBMA/MAA nanolatexes including functional monomers

| Nano-size Latex | Original Microemulsion in Step 1 (in g.) | | | | Monomer Mixture added in Step 2 (in g.) | Total Monomer Content (in g.) | Monomer/Surfactant ratio |
|---|---|---|---|---|---|---|---|
| | Monomer | SDS | 1-pentanol | Water (pH = 9-10) | | | |
| nL0 | 0.3 (monomer mixture - $M_1$) | 1.0 | 0.1 | 78.7 | 9.7 (monomer mixture - $M_2$) + 0.1 g. 1-pentanol | nBA/nBMA//MAA = 21/77/2 | 10.5 |
| nEL2 | 0.3 ($M_1$) | 1.0 | 0.1 | 77.7 | (a) 8.7 g. ($M_2$) + 0.1 g. 1-pentanol (b) 0.8 g. (monomer mixture - $M_3$) + 0.2 g. DAA | nBA/nBMA/DAA/MAA = 21/75/2/2 | 10.5 |
| nEL5 | 0.3 ($M_1$) | 1.0 | 0.1 | 77.7 | (a) 7.7 g. ($M_2$) + 0.1 g. 1-pentanol (b) 1.5 g. ($M_3$) + 0.5 g. DAA | nBA/nBMA/DAA/MAA = 21/72/5/2 | 10.5 |
| nIL2 | 0.3 ($M_1$) | 1.0 | 0.1 | 77.7 | (a) 9.7 g. ($M_2$) + 0.1 g. 1-pentanol | nBA/nBMA/1,3-BGDMA/MAA = 21/75/2/2 | 10.5 |
| nIL4 | 0.3 ($M_1$) | 1.0 | 0.1 | 78.7 | (a) 9.7 g. ($M_2$) + 0.1 g. 1-pentanol | nBA/nBMA/1,3-BGDMA/MAA = 21/73/4/2 | 10.5 |

For each nanolatex, the 3-neck flask was charged with a transparent microemulsion composed of 0.3 g of monomer mixture (M1—See Table 1), 1 g of SDS (monomer to surfactant ratio 10.5:1), 0.1 g of 1-pentanol, 78.7 g of DI water and few drops (10-14) of liquid ammonia (~30% in water) to make pH 9-10. The microemulsion was heated to 40° C. and stirred and purged by bubbling nitrogen through it for 5 minutes. Then, a solution of 0.0464 g of TMEDA (4 mM, based on total volume) in 5 g of water was added, followed by a solution of 0.0912 g of ammonium persulfate 4 (4 mM, based on total volume) in 5 g of water, which initiated the polymerization. Once the polymerization was initiated, the rest of the monomer (M2—See TABLE 5) was added drop wise (~6 drops/min., 9-10 sec./1 drop) through the addition funnel into the polymerizing microemulsion over 90-120 mins. During addition, temperatures were maintained at 40+/−1° C., a slow flow of nitrogen was maintained, and the reaction mixtures were stirred at a rate of 600 revolutions per minute. After addition was complete, stirring was continued at the end of the monomer addition and aqueous ammonia was used to adjust the pH of the product, instead of 2-amino-2-methyl-1-propanol, to reduce the potential for interference with the crosslinking reaction.

The resulting nanolatexes were characterized by measuring average particle size, $T_g$, pH, gel content, and viscosity, as shown in TABLE 2. For gel content measurements, an empty extraction thimble was dried at 85° C. in an oven for 2 h, cooled in a desiccator overnight, and weighed. Nanolatex films (prepared on glass and detached) were dried in a desiccator overnight, cut into small pieces, weighed, and put into the thimble. After a 12-h extraction with acetone in a Soxhlet extractor, the thimble was dried in an oven at 85° C. for 2 h, cooled in a desiccator overnight, and weighed. The gel content was calculated from the initial and final weights, assuming that gelled material remained in the thimble.

TABLE 2

Properties of nanolatex formulations.

| Name | Composition | Particle Size/nm | $T_g$/° C. | pH | Gel Content | Viscosity/mPa·s |
|---|---|---|---|---|---|---|
| nL0 | nBA/nBMA//MAA = 21/77/2 | 23 | 5 | 9.3 | 0 | 13 |
| nEL2 | nBA/nBMA/DAA/MAA = 21/75/2/2 | 23 | 3 | 9.7 | 98.1 | 13 |
| nEL5 | nBA/nBMA/DAA/MAA = 21/72/5/2 | 22 | 5 | 9.5 | 99.9 | 17 |
| nIL2 | nBA/nBMA/BGDMA/MAA = 21/75/2/2 | 23 | 5 | 9.1 | 63.8 | 13 |
| nIL4 | nBA/nBMA/BGDMA/MAA = 21/73/4/2 | 22 | 11 | 9.8 | 97.4 | 15 |

It is notable that the pre-coalescence crosslinked nanolatexes had gel content values much higher than their conventionally-sized latex counterparts. At 2 wt % of functional monomer, the gel content of nIL2 is 63.8 whereas a conventionally-sized latex of identical monomer composition is 57.1. Additionally, nIL-4, having 4 wt % of functional monomer has a gel content of approximately 97.4% whereas the gel content of a conventionally-sized latex of the same monomer composition is 64.2%.

After evaluating the liquid properties of the nanolatex formulations, the formulations were cast on TEFLON blocks to create films, and the films evaluated for mechanical and surface properties.

Film Mechanical Properties:

Stress-strain studies and dynamic mechanical analyses of each film was conducted using TA Instruments Model Q800 Dynamic Mechanical Analyzer (DMA) with a liquid nitrogen cooling accessory system (LNCS) (TA Instruments, New Castle, Del.). Specimens for stress-strain and dynamic mechanical studies were prepared on TEFLON blocks as described above for $T_g$ measurements. A constant-depth film cutter (TA Instruments, New Castle, Del.) was used to cut rectangular specimens about 15-20 mm long×3-6 mm wide× 0.1-0.2 mm thick from the cured films for testing.

The stress-strain studies were done at room temperature in air on the Q800 DMA. The films were mounted in a thin film tension clamp accessory. The instrument was operated in its controlled force mode with force ramped from 3 N/min up to 18 N/min, and the resultant % strain was observed. DMA measurements of dried specimens were performed at a frequency of 1 Hz, again using the thin film tension clamp. The dynamic mechanical analyses (storage/loss modulus and tan delta) were studied over the temperature range of −100° C. to 100° C., using liquid nitrogen as a coolant. The flow rate of liquid nitrogen into the DMA depends upon the starting temperature desired and is controlled to adjust the heating rate to 3° C./min. The results of these measurements are summarized in TABLE 3.

TABLE 3

Mechanical and surface properties of nanolatex formulations.

| Name | Young's modulus/MPa | Area under curve (relative) | Pencil Hardness D 3363 | MEK rub resistance | Tape Adhesion X-hatch, D3359 | Specular Gloss, 20/60 degree |
|---|---|---|---|---|---|---|
| nL0 | 2 | 33 | 4B | 15 | 5B | 49/80 |
| nEL2 | 4 | 72 | 4B | 75 | 5B | 51/78 |
| nEL5 | 11 | 151 | B | 100 | 5B | 52/86 |
| nIL2 | 6 | 40 | 4B | 17 | 5B | 40/86 |
| nIL4 | 5 | 53 | 4B | 20 | 5B | 39/88 |

Example 3

Mixtures of High $T_g$ Conventional Latexes with Low $T_g$ Nanolatexes

No Crosslinkers

Conventional Latex:

A conventional latex having a 9/89/2 ratio of n-butyl acrylate ("nBA")/n-butyl methacrylate ("nBMA")/methacrylic acid ("MMA"), resulting in a $T_g$ of about 20-25° C., was prepared under a nitrogen atmosphere in a 5-L, 4-neck flask ("kettle") (Ace Glass, Vineland, N.J.) equipped with a mechanical stirrer (fitted with a 125 mm crescent TEFLON blade). One neck was used for the mechanical stirrer, another neck was used as an inlet for a monomer emulsion fed by an FMI peristaltic pump (Fluid Metering Inc., Syosset, N.Y.) as well as an inlet for an initiator solution stream fed by a calibrated programmable syringe pump (Cole-Parmer Instruments, Vernon Hills, Ill.). Another neck was connected to a reflux condenser, and the last neck held a thermometer, which was immersed in the reaction mixture. The thermometer was connected to a temperature control system (Therm-O-Watch, Terre Haute, Ind.) capable of adjusting the temperature by raising or lowering a heating mantle with a pneumatic jack as necessary to maintain the desired temperature. Additionally, a jet of room temperature air was directed at the flask for cooling when the mantle was lowered. Using this temperature control system, it was possible to maintain the desired temperature within ±1° C.

Using the above setup, the conventional latex was prepared in the following steps:

STEP 1: The kettle was charged with 773 g of DI water and 6.67 g of sodium dodecyl sulfate ("SDS") (Sigma-Aldrich, St. Louis, Mo.), a surfactant. (The final ratio of surfactant/monomer (wt/wt) was approximately 3/100.)

STEP 2: In a graduated beaker with a magnetic stirrer 369 g of DI water, 167 g of SDS, 353 g of n-butyl acrylate ("nBA") (Sigma-Aldrich, St. Louis, Mo.), 1260 g of n-butyl methacrylate ("nBMA") (Sigma-Aldrich, St. Louis, Mo.), and 33.6 g of methacrylic acid ("MAA") (Sigma-Aldrich, St. Louis, Mo.) were mixed to give a white monomer emulsion.

STEP 3: Separately, an initiator solution of 3.37 g of ammonium persulfate (Fisher Scientific, Waltham, Mass.) in 178 g of DI water was prepared.

STEP 4: To make a "preform" (seed latex), the kettle contents were heated to 80-82° C. and stirred as the following ingredients were added sequentially: (a) 44.5 g of the monomer emulsion (step 2), (b) 47.5 g of DI water, (c) a solution of 5.83 g of anhydrous sodium carbonate (Fisher Scientific, Waltham, Mass.) in 47.5 g of DI water, and (d) a solution of 4.98 g of ammonium persulfate in 47.5 g of DI water. The mixture was stirred at 80-82° C. for 20 min.

STEP 5: After preform formation, the main charge was added by simultaneously pumping the monomer emulsion (step 2) using the peristaltic pump and the initiator solution (step 3) using the syringe pump, with continuous stirring of the reaction flask and the monomer emulsion. The monomer emulsion was added at a rate of 450 mL/h for the first 20 min and at a rate of 900 mL/h for the next 160 min. The rate of decrease of the volume of monomer emulsion in the graduated beaker was used to meter the feed rate. The initiator solution (step 3) was added throughout the process at a rate of 60 mL/h using the syringe pump. Throughout the 3-h addition, the kettle temperature was maintained at 80-82° C. After the addition was complete, the temperature of the kettle was maintained at 80-82° C. for an additional 30 min.

STEP 6: As step 5 approached completion, a solution of 1.6 g of 2,2'-azobis[2-(2-imidazolin-2-yl) propane] (VA-061) (Wako Pure Chemical Industries, Ltd., Osaka, Japan) in 320 g of DI water was prepared and heated to about 70° C.

STEP 7: With the kettle temperature at 80-82° C., the 2,2'-azobis[2-(2-imidazolin-2-yl)propane] solution was added all at once. The temperature of the kettle was then increased to 91-93° C. and held for 2 h with continued stirring STEP 8: The resulting conventional latex in the kettle was cooled to about 60° C., and a 50/50 wt/wt, solution of 2-amino-2-methyl-1-propanol ("AMP-95," Angus Chemical Company, Buffalo Grove, Ill.) in DI water (about 30 mL) was added with continued stirring to adjust the pH to 9.2-9.5.

STEP 9: The kettle temperature was reduced to about 40° C., and a solution 1.44 g of "Proxyl GXL" (Avecia Biocides, Milford, Mass.), a bio-stabilizer, in 14 g of water was added and stirred in.

STEP 10: The latex was filtered through a tared 200-mesh sieve.

Coagulum was assessed by drying the sieve and weighing the material collected. The resulting convention latex had an average particle size of 126 nm as measured with a MICROTRAC Series 9200 light scattering instrument (Microtract, Montgomeryville, Pa.), and a viscosity of 120 MPa/s, as measured with a Brookfield Viscometer Model DV-1 (Brookfield Engineering, Middleboro, Mass.), using spindle #4 at 20 rpm. A transition glass temperature of $T_g=26.3°$ C. was measured with a TA Instruments Model 2920 modulated differential scanning calorimeter (MDSC) with liquid nitrogen cooling accessory system (LNCS) (TA Instruments, New Castle, Del.). Prior to $T_g$ measurements, a sample film was dried on a glass panel in an oven at 55° C. and 50% humidity, and then allowed to cure for an additional week at ambient temperature and humidity prior to testing. Temperature scans were done from –100° C. to 100° C. at 2° C./min with modulation of ±1.00° C. at every 60 seconds under nitrogen.

The pre-coalescence and the post-coalescence conventional crosslinkable latexes, (described in TABLE 9 & 10), were made by essentially identical procedures. For the pre-coalescence crosslinked conventional latexes, the functional monomers were included in the monomer mixture recipe. In case of the post-coalescence conventional crosslinkable latexes, crosslinkable monomer was added at the end of the monomer addition and aqueous ammonia was used to adjust the pH of the product, instead of 2-amino-2-methyl-1-propanol, to reduce the potential for interference with the crosslinking reaction.

Conventional/Nanolatex Mixtures:

The conventional latex, formed above, and the nanolatex, formed in EXAMPLE 1, were mixed in a variety of ratios with gentle stirring in a glass beaker, to produce five mixtures, as shown in TABLE 4. The blends are coded as first two/three alphanumeric for conventional latexes (as described above) and the second three/four alphanumeric for nanolatexes (as described above) separated using a hyphen. For example, H0_nL0 showed blend of high $T_g$ conventional latex with no crosslinker with low $T_g$ nanolatex with no crosslinker. The latexes are coded I for pre-coalescence or internal, E for post-coalescence or external, L for low $T_g$, H for high $T_g$, and a number for the weight % of crosslinker or reactive site in the monomer line up. Thus, for example, IL-2 means an internally (or pre-coalescence) crosslinked, low $T_g$ latex with 2.0 wt. % of 1,3-BGDMA and EH-1 means an externally (or post-coalescence) crosslinked, high $T_g$ latex with 1.0 wt. % of DAA.

Film Mechanical Properties:

Dynamic mechanical analysis of each film was conducted using TA Instruments Model Q800 Dynamic Mechanical Analyzer (DMA) with a liquid nitrogen cooling accessory system (LNCS) (TA Instruments, New Castle, Del.). Specimens for stress-strain and dynamic mechanical studies were prepared on glass panels and TEFLON blocks as described in above for $T_g$ measurements. A constant-depth film cutter (TA Instruments, New Castle, Del.) was used to cut rectangular specimens about 15-20 mm long×3-6 mm wide×0.1-0.2 mm thick from the cured films for testing.

The stress-strain studies were done at room temperature in air on the Q800 DMA. The films were mounted in a thin film tension clamp accessory. The instrument was operated in its controlled force mode with force ramped from 3 N/min up to 18 N/min, and the resultant % strain was observed. DMA measurements of dried specimens were performed at a frequency of 1 Hz, again using the thin film tension clamp. The dynamic mechanical analyses (storage/loss modulus and tan delta) were studied over the temperature range of –100° C. to 100° C., using liquid nitrogen as a coolant. The flow rate of liquid nitrogen into the DMA depends upon the starting temperature desired and is controlled to adjust the heating rate to 3° C./min. The results of these measurements are shown in FIG. 1. From the curves in FIG. 1, it is possible to quantify the stress/strain ratio for each mixture, as well as Young's modulus, using techniques known by those of skill in the relevant art. The values obtained from the curves in FIG. 1 are summarized in TABLE 4.

TABLE 4

Conventional/Nanolatex mixtures (no crosslinker) and measurements of mechanical properties of resulting films.

| Name | % Conv. (H0) | % Nano. (nL0) | Young's Mod. (MPa) | Stress/Strain (A. under curve) |
|---|---|---|---|---|
| H0_nL0 (0%) | 100 | 0 | 16 | 175 |
| H0_nL0 (7.5%) | 92.5 | 7.5 | 46 | 177 |
| H0_nL0 (15%) | 85 | 15 | 149 | 528 |
| H0_nL0 (30%) | 70 | 30 | 67 | 201 |
| H0_nL0 (50%) | 50 | 50 | 38 | 125 |
| H0_nL0 (70%) | 30 | 70 | 44 | 117 |
| H0_nL0 (100%) | 0 | 100 | 2 | 33 |

(% in name corresponds to % nanolatex.)

As can be seen in FIG. 1 and TABLE 4, mixtures of conventional and nano nBA/nBMA/MAA latexes have superior mechanical properties to either the conventional latex (H0_nL0 (0%)) or the nanolatex (H0_nL0 (100%)) alone. Furthermore, the mixture H0_nL0 (15%) shows an unexpected synergy: an 85/15 mixture of conventional/nano latex has a Young's modulus nearly 10 times larger than the conventional latex (alone) and nearly 75 times larger than the nanolatex (alone).

Film Surface Properties:

Prior to measuring the film properties, each latex was cast on separate precleaned aluminum test panel using a square wet film applicator (Paul N. Gardner Co., Pompano Beach, Fla.) and baked overnight at 70° C. and 50% relative humidity. Dry film thickness was approximately 50 μm for all samples, as measured with an Elcometer 345 Digital Coating thickness gauge (Electrometer Instruments, Ltd., Manchester, England). The solvent resistance of each test panel was determined by methyl ethyl ketone (MEK) rubbing, in which each panel was rubbed with a ball peen hammer (448-g head) wrapped with cheesecloth soaked with MEK. The reported end point was the number of double rubs required to break through the film, exposing bare metal. Pencil hardness was tested at 25° C. following the procedure of ASTM D 3363, whereby each coating was evaluated for scratch resistance against a series of calibrated pencils of increasing hardness. Tape adhesion was measured using the ASTM D 3359 protocol, using a cross-cut kit (Precision Gage & Tool Company, Dayton, Ohio). The specular gloss of each mixture was measured using the ASTM D 523 protocol and a BYK micro-TRI-gloss meter (BYK Gardner, Columbia, Md.). Specimens were prepared on glass panels and allowed to dry at 70° C. and 50% relative humidity for 8-10 hours and then cured for a week at ambient temperature and humidity prior to measuring specular gloss at 20° and 60°. The results of these measurements are shown in TABLE 5.

TABLE 5

Properties of films of mixtures of conventional latexes and nanolatexes.

| Name | Pencil Hardness D 3363 | MEK rub resistance | Tape Adhesion X-hatch, D3359 | Specular Gloss, 20/60 degree |
|---|---|---|---|---|
| H0_nL0 (0%) | 4B | 7 | 4B | 19/35 |
| H0_nL0 (7.5%) | HB | 9 | 5B | 50/77 |
| H0_nL0 (15%) | B | 10 | 5B | 73/93 |
| H0_nL0 (30%) | B | 16 | 5B | 58/80 |
| H0_nL0 (50%) | B | 20 | 5B | 65/86 |
| H0_nL0 (70%) | B | 18 | 5B | 27/65 |
| H0_nL0 (100%) | 4B | 15 | 5B | 49/79 |

(% in name corresponds to % nanolatex. See TABLE 4.)

As can be seen in TABLE 5, adhesion to aluminum improves from 4B (good) to 5B (highest rating) for all the above blends containing nanoparticles. For all of the blends, and the nanolatex alone, tape adhesion was measured at 5B. Unfortunately, because of the limitations of the ASTM D 3359 test, it is unknown whether the blends reflect a modest or a large improvement in adhesion over the nanolatex alone. The gloss measurements show that conventional/nano latex blends have a higher gloss than conventional latex alone. While the gloss measurements do not follow a clear-cut trend, it is clear that including nanoparticles increases specular gloss over the conventional latex alone. One theory is that the nanolatex particles tend to populate the voids in the conventional latex surface as the films form, making the surfaces smoother.

Figure 3:
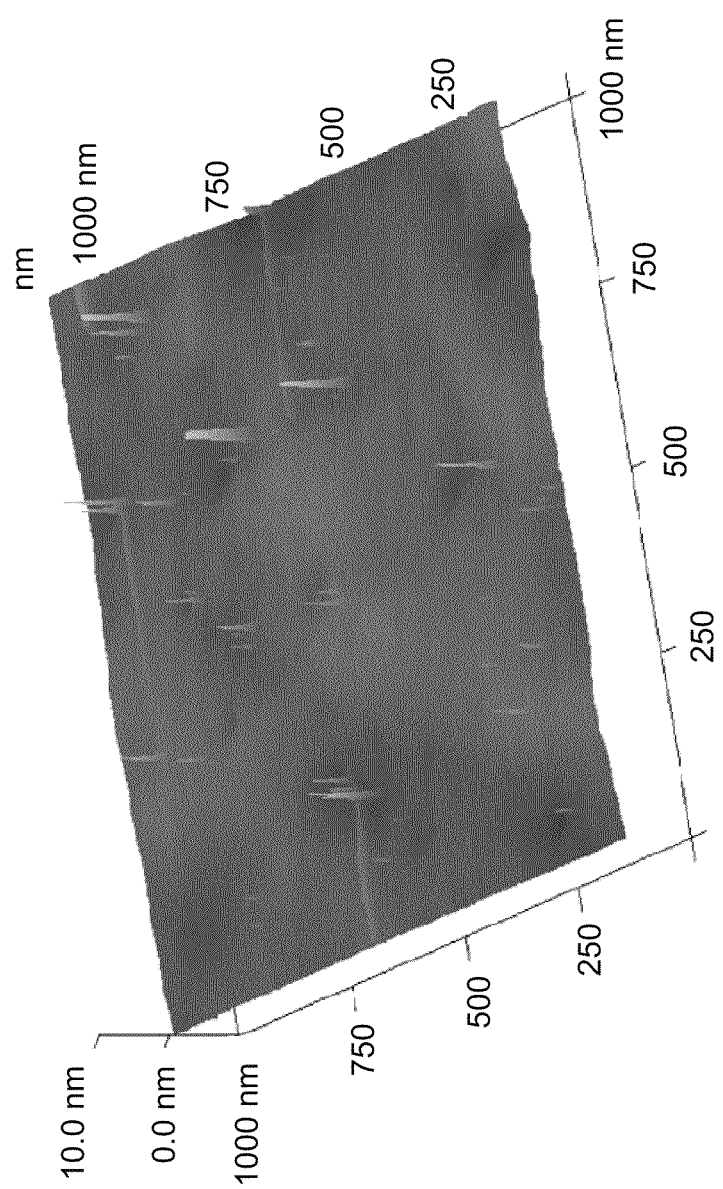
FIG. 3 shows a (tapping mode) AFM image of a film created from an 85/15 blend of a conventional nBA/nBMA/MAA latex ($T_g$=26° C.) and an nBA/nBMA/MAA nanolatex ($T_g$=5° C.).
Figure 4:
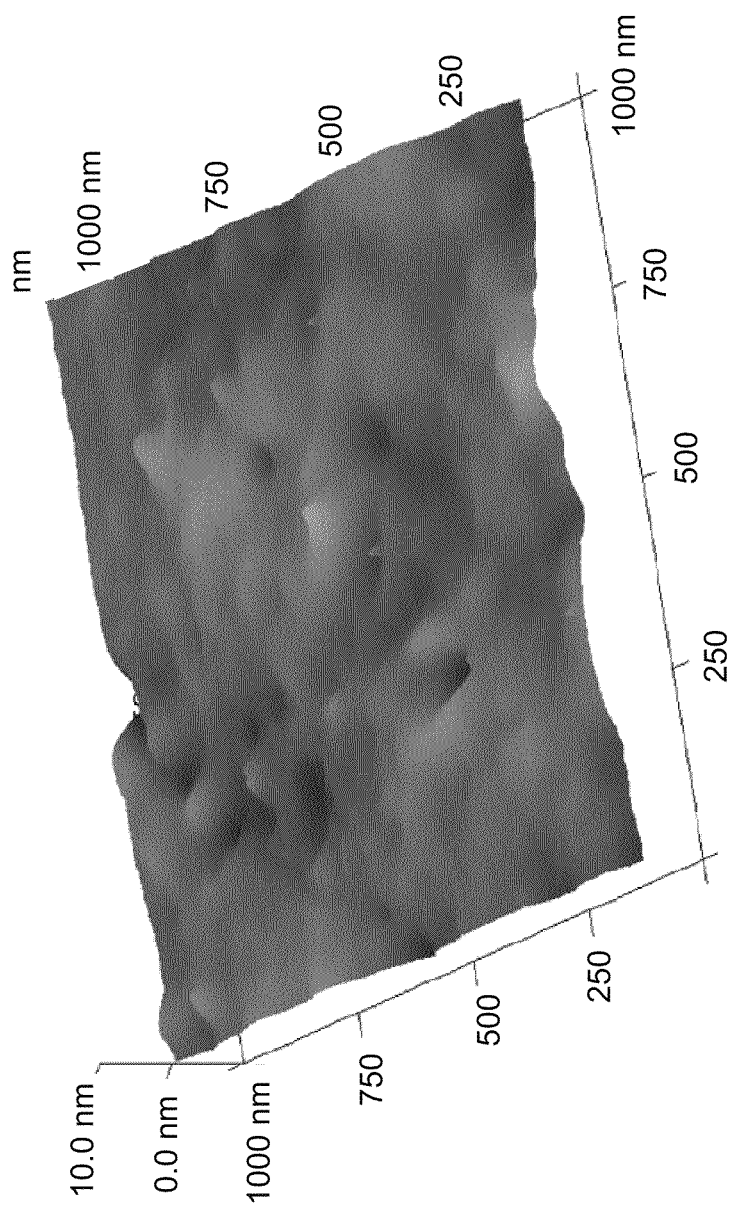
FIG. 4 shows a (tapping mode) AFM image of a film created from an 70/30 blend of a conventional nBA/nBMA/MAA latex ($T_g$=26° C.) and an nBA/nBMA/MAA nanolatex ($T_g$=5° C.).
Figure 5:
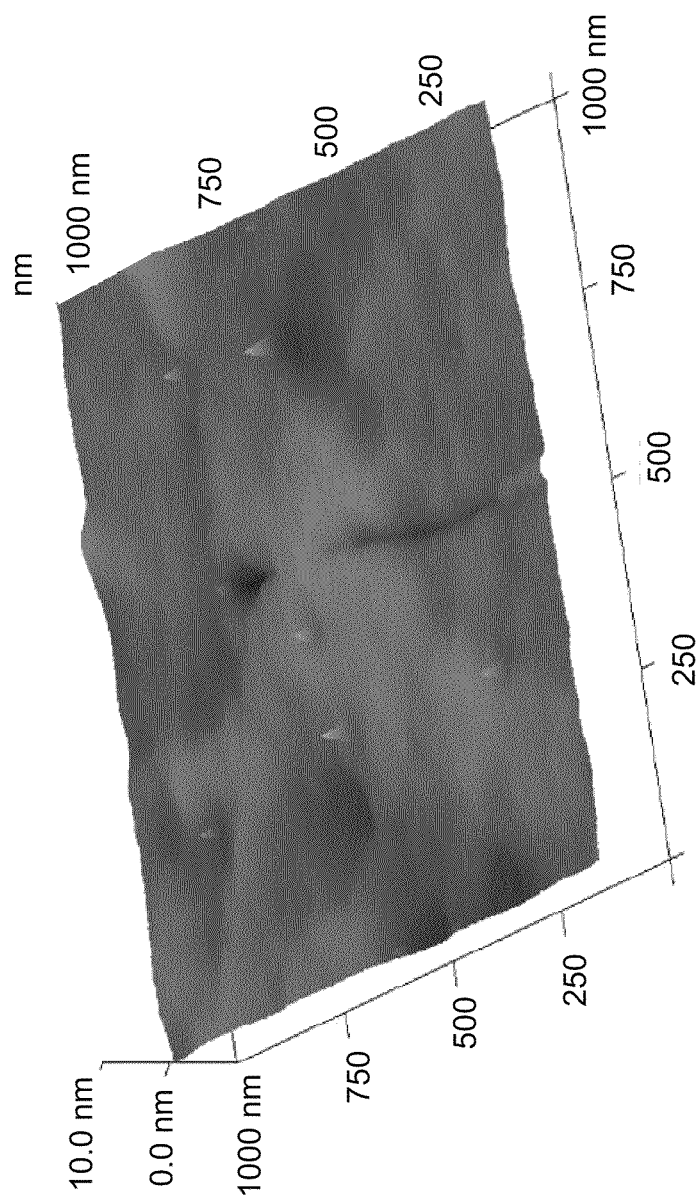
FIG. 5 shows a (tapping mode) AFM image of a film created from an 50/50 blend of a conventional nBA/nBMA/MAA latex ($T_g$=26° C.) and an nBA/nBMA/MAA nanolatex ($T_g$=5° C.).
Figure 6:
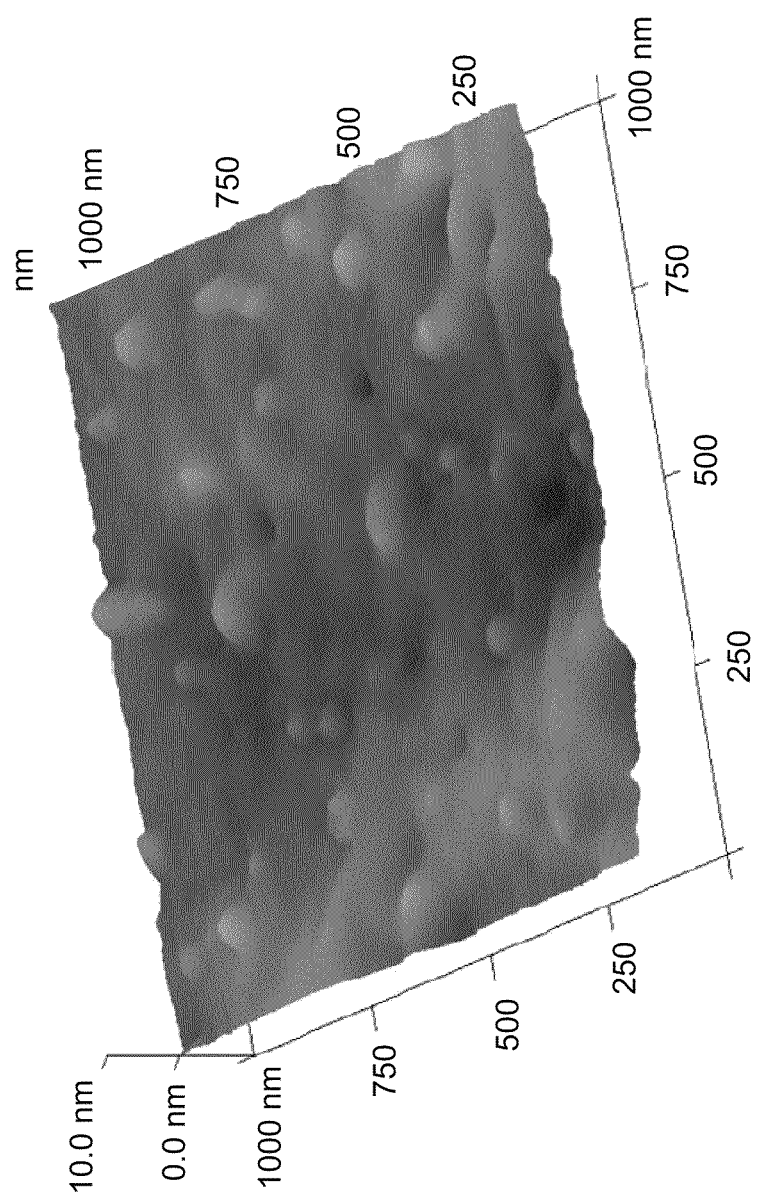
FIG. 6 shows a (tapping mode) AFM image of a film created from an 30/70 blend of a conventional nBA/nBMA/MAA latex ($T_g$=26° C.) and an nBA/nBMA/MAA nanolatex ($T_g$=5° C.).
Figure 7:
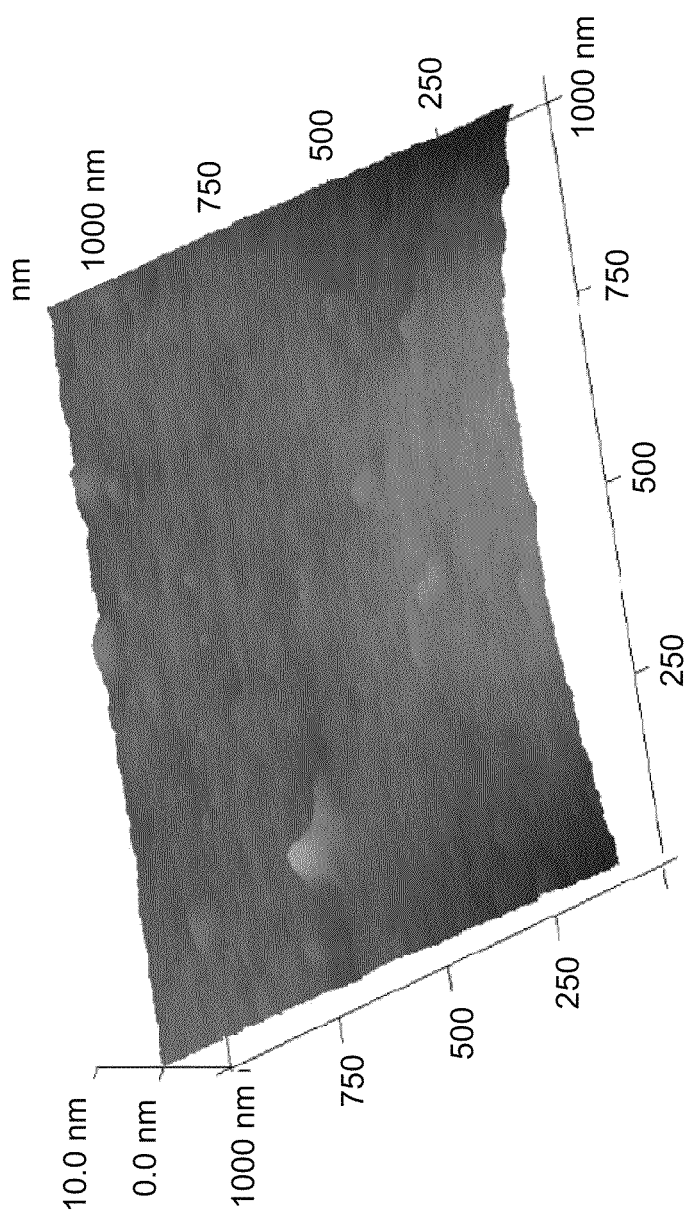
FIG. 7 shows a (tapping mode) AFM image of a film created from an nBA/nBMA/MAA nanolatex with an average particle size of 23 nm.

In order to verify this theory, the films were imaged with atomic force microscopy (AFM) (tapping mode), using a Digital Instruments Multimode AFM (Veeco Instruments, Plainview, N.Y.) with a Nanoscope IIIa controller and an E-scanner (X-Y scanning limit of 15 µm and a Z limit of 2 µm). The latex samples were conditioned in an oven at 70° C. and 50% humidity for 8-10 hours and then stored at normal room conditions for a week before imaging. Both height and phase data were captured at an image size of 2×2 µm (for conventionally sized latexes), and 1×1 µm (for nanosize latexes and latex blends). The AFM images for H0_nL0 (0%), H0_nL0 (15%), H0_nL0 (30%), H0_nL0 (50%), H0_nL0 (70%), and H0_nL0 (100%) are shown in FIGS. 2-7, respectively. The prominent spikes in FIGS. 3 and 5 are artifacts likely caused by the AFM tip sticking to the film momentarily. The average and the area surface roughness was measured with the AFM using a computer program built into the instrument. (Surface smoothness is the reciprocal of surface roughness (Ra) as measured by this instrument.)

Figure 8:
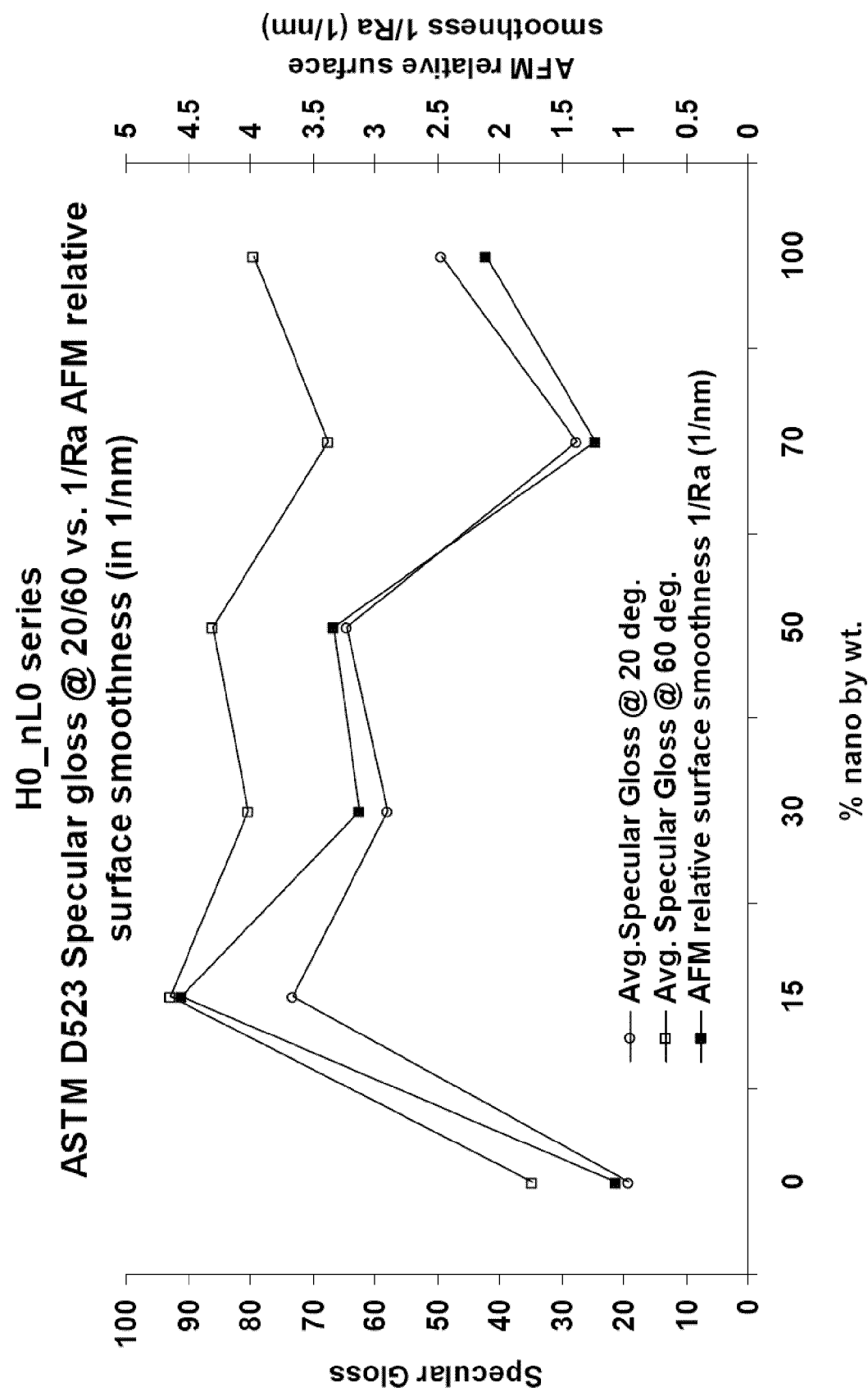
FIG. 8 compares the specular gloss at 20° and 60° and the relative smoothness, as measured with an atomic force microscope, for the conventional latex/nanolatex blends of EXAMPLE 3 (no crosslinkers).

Looking at FIGS. 2-7, it appears that there is a rough correlation between measured gloss and measured surface smoothness. Notably, the 15% nanolatex formulation, which had the highest gloss ratings, also had the smoothest surface. The correlation between gloss and surface smoothness is better evaluated in FIG. 8 which compares the measured specular gloss of the latex mixtures to the average relative surface smoothness. While the smoothness is maximum for the 15% nanolatex formation, the 30% and 50% nanolatex blends also have exceptional smoothness and specular gloss, in comparison to the conventional latex.

Example 4

Mixtures of High $T_g$ Conventional Latexes with Low $T_g$ Nanolatexes Post-Coalescence Crosslinker A 9/89/2 nBA/nBMA/MAA conventional latex, having a $T_g$=20-25° C., was prepared using the conventional latex synthesis protocol of EXAMPLE 3. A 21/72/5/2 nBA/nBMA/DAA/MAA nanolatex having a $T_g$=5-10° C. was prepared by adding 5 wt % of diacetone acrylamide (DAA) (Sigma-Aldrich, St. Louis, Mo.) to the nanolatex monomer blend, and completing the nanoparticle latex synthesis protocol described in EXAMPLE 2. The presence of DAA provided reactive sites for post-coalescence cross-linking via the addition of adipic dihydrazide (Sigma-Aldrich, St. Louis, Mo.) prior to casting films of the conventional/nano latex mixtures. The nanolatex with 5% DAA ("nEL5") had a measured Tg=5° C., and an average particle size of 22 nm.

Figure 9:
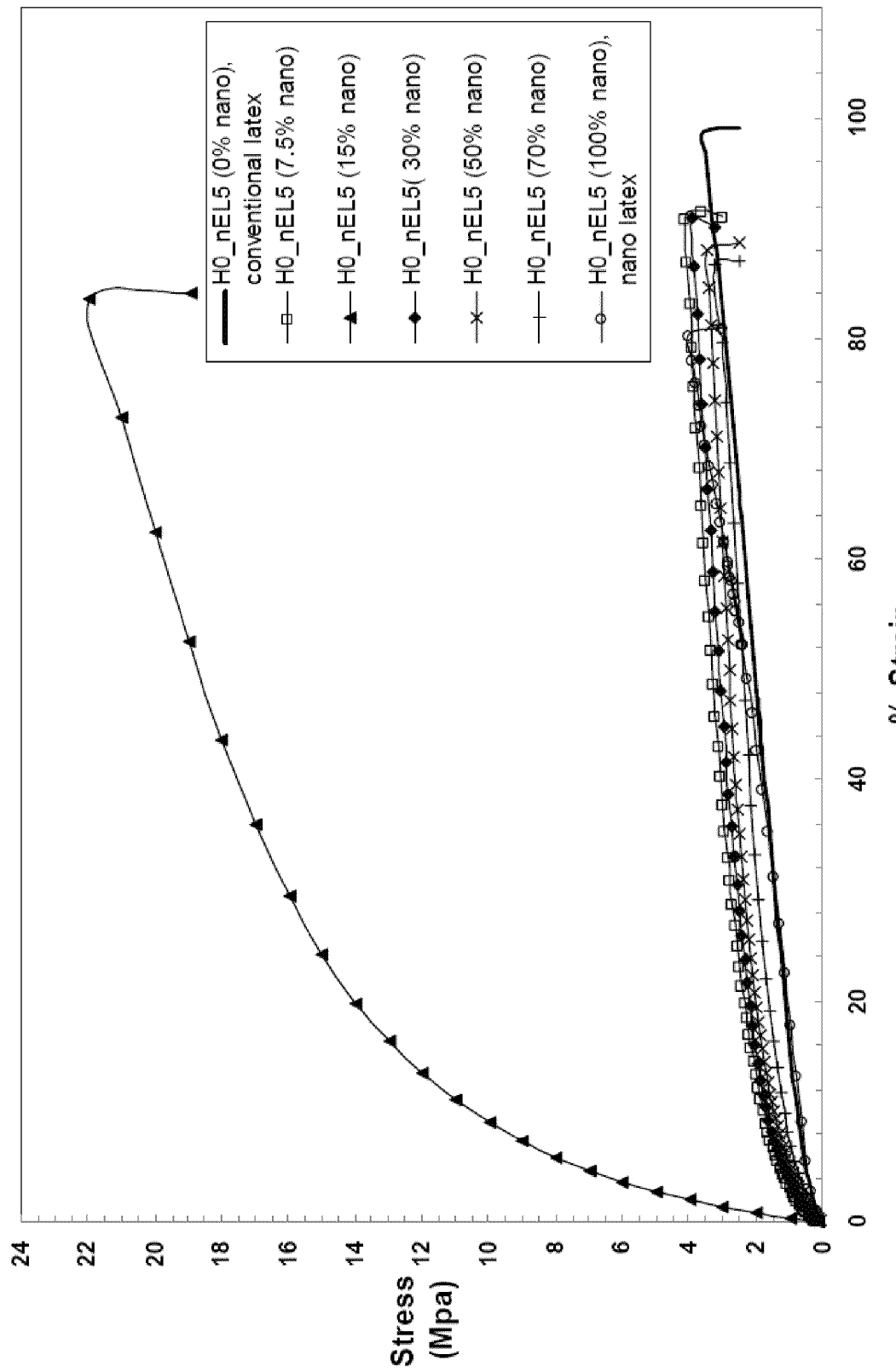
FIG. 9 shows stress/strain curves for the nBA/nBMA/MAA conventional latex and nBA/nBMA/DAA/MAA nanolatex blends (with crosslinking) described in EXAMPLE 4.

The conventional and nanolatexes were mixed in a variety of ratios by first adding the large % wt component to a beaker, then adding the small % wt component, and mixing gently with a spatula. Five mixtures were produced, as shown in TABLE 6. Prior to casting a film for testing, adipic dihydrazide was added at 1 mole of adipic dihydrazide per 2 moles of diacetone acrylamide, and mixed with gentle stirring. It is suspected that the adipic dihydrazide crosslinks the DAA in the nanolatex at a late stage of film-formation (e.g., post-coalescence). As in EXAMPLE 1, the films were cast on glass panels or TEFLON blocks, and then evaluated using a TA Instruments Model Q800 Dynamic Mechanical Analyzer, resulting in the curves shown in FIG. 9, and the values listed in TABLE 6.

TABLE 6

Conventional/Nanolatex mixtures (adipic dihydrazide crosslinker) and measurements of mechanical properties of resulting films.

| Name | % Conv. (H0) | % Nano. (nL0) | Young's Mod. (MPa) | Stress/Strain (A. under curve) |
|---|---|---|---|---|
| H0_nEL5 (0%) | 100 | 0 | 16 | 175 |
| H0_nEL5 (7.5%) | 92.5 | 7.5 | 81 | 189 |
| H0_nEL5 (15%) | 85 | 15 | 206 | 983 |
| H0_nEL5 (30%) | 70 | 30 | 53 | 183 |
| H0_nEL5 (50%) | 50 | 50 | 33 | 151 |
| H0_nEL5 (70%) | 30 | 70 | 26 | 133 |
| H0_nEL5 (100%) | 0 | 100 | 11 | 151 |

As was the case for the non-crosslinked conventional/nanolatex mixtures, the 85/15 mixture displayed an unexpected synergy, having a Young's modulus more than 10 times greater than the conventional latex or the nanolatex alone. However, the addition of crosslinker resulted in a 40% increase in the value of the Young's modulus for the 85/15 mixture as compared to the 85/15 mixture without crosslinker (EXAMPLE 1). See FIG. 9.

Figure 10:
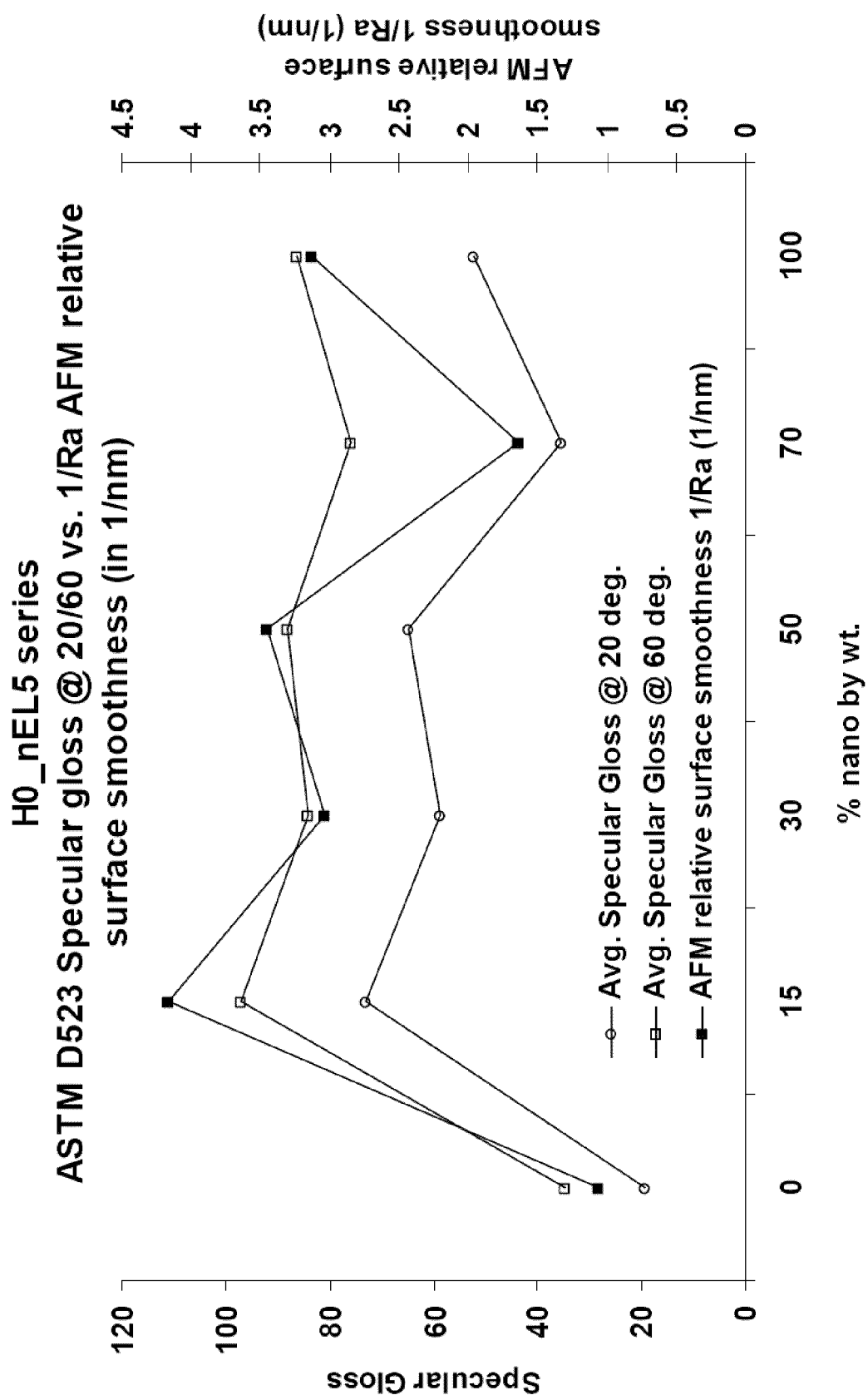
FIG. 10 compares the specular gloss at 20° and 60° and the relative smoothness, as measured with an atomic force microscope, for the conventional latex/nanolatex blends of EXAMPLE 4 (with crosslinking).

In addition to mechanical testing, the surface properties of the films with crosslinked nanolatexes were also evaluated, as in EXAMPLE 3. The results are shown in TABLE 7. As in EXAMPLE 3, the 85/15 conventional/nanolatex mixture was the highest performing mixture. Nonetheless, all of the mixtures that included crosslinked nanolatexes had better hardness and rub resistance than mixtures without crosslinkers, i.e., the films of TABLE 7 were more durable than the films of TABLE 4. The gloss values did not change appreciably with the addition of crosslinker, providing additional evidence that the surface smoothness is more a function of size than chemical composition. AFM images of the films of TABLE 7 were similar to those shown in FIGS. D-J. The measured average relative surface smoothness of the films of TABLE 7 are compared to the specular gloss measurements in FIG. 10.

TABLE 7

Surface properties of mixtures of conventional latexes and nanolatexes.

| Name | Pencil Hardness D 3363 | MEK rub resistance | Tape Adhesion X-hatch, D3359 | Specular Gloss, 20/60 degree |
|---|---|---|---|---|
| H0__nEL5 (0%) | 4B | 7 | 4B | 19/35 |
| H0__nEL5 (7.5%) | F | 16 | 5B | 61/81 |
| H0__nEL5 (15%) | HB | 20 | 5B | 73/97 |
| H0__nEL5 (30%) | B | 18 | 5B | 59/84 |
| H0__nEL5 (50%) | B | 20 | 5B | 65/88 |
| H0__nEL5 (70%) | B | 12 | 5B | 35/76 |
| H0__nEL5 (100%) | B | 100 | 5B | 52/86 |

(% in name corresponds to % nanolatex. See TABLE 7.)

The 85/15 mixture with crosslinker is compared to the state of the art in TABLE 8: a conventional crosslinked latex having 9/84/5/2 nBA/nBMA/DAA/MAA ratio, a $T_g=30°$ C., and an average particle size of 129 nm; and a conventional crosslinked latex having a 21/72/5/2 nBA/nBMA/DAA/MAA ratio, a $T_g=15°$ C., and an average particle size of 137 nm. The conventional crosslinked latexes and the 85/15 conventional/nanolatex (crosslinked) films were cast with stoichiometric amounts of adipic dihydrazide, and the mechanical properties were evaluated with a TA Instruments Model Q800 Dynamic Mechanical Analyzer. Remarkably, the 15% nanolatex mixture, with only enough crosslinker for the nanolatex, resulted in a film having a Young's modulus that was 30% greater than a high $T_g$, fully-crosslinked conventional latex. See TABLE 8. In other words, despite an 85% reduction in the amount of post-coalescence crosslinker used, blending a high $T_g$ conventional latex with low $T_g$ nanolatexes produced films superior to the state of the art. Assuming that creating the nanolatexes is less expensive than producing adipic dihydrazide, the 85/15 (nano-crosslinked) mixture represents a lower-cost method to produce films superior to the state of the art.

The 85/15 conventional/nanolatex blend may exhibit synergistic properties because of the ratio of the conventional latex particle size to the nanolatex particle size, approximately 5:1. After accounting for the approximate mass per particle for the conventional and nanolatexes in EXAMPLE 3, the 85/15 (wt/wt) conventional/nanolatex blend works out to be a ratio of approximately 1 conventional latex particle per 25 nanolatex particles, which is a preferred particle ratio for a mixture containing an average 6:1 conventional latex to nanolatex size ratio.

Example 5

Comparison of Various 85/15 Conventional/Nanolatex Mixtures

Because the 85/15 conventional (high $T_g$)/nanolatex (low $T_g$) mixtures showed synergistic properties when compared to the conventional (high $T_g$) or nanolatex (low $T_g$) films alone, a number of additional 85/15 conventional/nanolatex mixtures were formulated by varying the conventional and nanolatex synthesis protocols of EXAMPLES 1-4. Before the conventional/nanolatex blends were formed, the conventional and nanolatexes were characterized independently of the mixtures.

Conventional latexes—A series of conventional latexes were prepared, as shown in TABLE 9, by varying the monomer blend to change the $T_g$ and to allow for pre- or post-coalescence crosslinking. As before, DAA was added to allow for post-coalescence crosslinking via the addition of adipic dihydrazide. (Latexes capable of post-coalescence crosslinking are labeled with an "E" for "external.") Other conventional latexes comprised additional 1,3-butylene glycol dimethacrylate ("BGDMA") (Sigma-Aldrich, St. Louis, Mo.), which promotes pre-coalescence crosslinking, e.g., crosslinking between the monomers as the film is cast and before coalescence. (Latexes capable of pre-coalescence crosslinking are labeled with an "I" for "internal.") The DAA or the BGDMA was added at during the formation of the initial monomer emulsion, e.g., step 2 in EXAMPLE 1.

TABLE 9

Conventional latex formulations.

| Name | Composition | Particle Size/nm | Tg/° C. | pH |
|---|---|---|---|---|
| L0 | nBA/nBMA//MAA = 21/77/2 | 134 | 7 | 9.8 |
| EL5 | nBA/nBMA/DAA/MAA = 21/72/5/2 | 137 | 12 | 9.7 |
| IL4 | nBA/nBMA/BGDMA/MAA = 21/73/4/2 | 123 | 15 | 9.2 |
| H0 | nBA/nBMA//MAA = 9/89/2 | 126 | 26 | 9.1 |
| EH5 | nBA/nBMA/DAA/MAA = 9/84/5/2 | 129 | 30 | 9.8 |
| IH4 | nBA/nBMA/BGDMA/MAA = 9/85/4/2 | 125 | 33 | 9.2 |

TABLE 8

Comparison of high $T_g$ conventional latex (5% post-coalescence crosslinker) and low $T_g$ conventional latex (5% post-coalescence crosslinker) to 85/15 mixture of high $T_g$ conventional latex (no crosslinker) and low $T_g$ nanolatex (5% post-coalescence crosslinker).

| Description | % crosslinked polymer | Young's modulus/MPa | Area under curve | Strain to break/% | Pencil hardness |
|---|---|---|---|---|---|
| High Tg conventional latex | 100 | 159 | 174 | 39 | B |
| Low Tg conventional latex | 100 | 45 | 196 | 42 | 2B |
| 85/15 conventional/nanolatex | 15 | 206 | 983 | 85 | HB |

The conventional latex formulations were then evaluated for mechanical and surface properties using the techniques outlined in EXAMPLES 1-3, as shown in TABLE 10.

TABLE 10

Mechanical and surface properties of conventional latex formulations.

| Name | Young's modulus/MPa | Area under curve (relative) | Pencil Hardness D 3363 | MEK rub resistance | Tape Adhesion X-hatch, D3359 | Specular Gloss, 20/60 degree |
|---|---|---|---|---|---|---|
| L0 | 9 | 172 | 4B | 5 | 4B | 18/39 |
| EL5 | 45 | 197 | 4B | 7 | 4B | 19/35 |
| IL4 | 50 | 222 | 2B | 83 | 4B | 19/37 |
| H0 | 16 | 175 | 4B | 6 | 3B | 12/32 |
| EH5 | 159 | 174 | B | 106 | 5B | 23/50 |
| IH4 | 213 | 186 | 5B | 4 | 5B | 19/38 |

85/15 Conventional/nanolatex mixtures—A series of nanolatexes were prepared, as discussed in EXAMPLE 3-4 and shown in TABLE 4, by varying the monomer blend to change the $T_g$, and to allow for pre- or post-coalescence crosslinking. A number of combinations of conventional latexes and nanolatexes were combined in an 85/15 (wt/wt) ratio, as shown in TABLE 11. The mixtures were then evaluated for mechanical and surface properties using the techniques outlined in EXAMPLES 1-3, as shown in TABLE 11.

TABLE 11

Mechanical and surface properties of 85/15 conventional/nanolatex formulations.

| Mixture | Young's modulus/MPa | Area under curve (relative) | Pencil Hardness D 3363 | MEK rub resistance | Tape Adhesion X-hatch, D3359 | Specular Gloss, 20/60 degree |
|---|---|---|---|---|---|---|
| L0_nL0 | 10 | 83 | 2B | 5 | 5B | 39/72 |
| H0_nL0 | 149 | 528 | B | 10 | 5B | 73/93 |
| L0_nEL2 | 10 | 154 | B | 24 | 5B | 46/68 |
| L0_nIL4 | 10 | 73 | HB | 12 | 5B | 45/72 |
| H0_nIL2 | 194 | 530 | HB | 12 | 5B | 60/80 |
| H0_nEL5 | 206 | 983 | HB | 8 | 5B | 73/97 |
| EL5_nL0 | 95 | 541 | B | 110 | 5B | 52/70 |
| IL4_nL0 | 30 | 239 | HB | 10 | 5B | 48/67 |
| EH5_nL0 | 222 | 429 | HB | 125 | 4B | 68/82 |
| IH4_nL0 | 150 | 355 | F | 4 | B | 55/88 |

By comparing the mechanical and surface properties of the conventional latexes and the nanolatexes to the mechanical and surface properties of the 85/15 conventional/nanolatex mixtures, it is clear that the synergies of the 85/15 mixtures extend beyond EXAMPLES 3 & 4. For example, H0_nL2 had very similar performance to H0_nL5 (EXAMPLE 4), despite the fact that the nIL2 nanolatex was pre-coalescence crosslinked with only 2% crosslinker, while nEL5 was post-coalescence crosslinked with 5% crosslinker. The data in TABLE 11 additionally suggest that conventional/nanolatex blends, wherein the conventional latex has a $T_g=20-35°$ C., result in stronger films, as opposed to blends having a conventional latex with a $T_g=0-10°$ C.

Example 6

Comparison of Various 70/30 Conventional/Nanolatex Mixtures

A number of 70/30 conventional/nanolatex mixtures were formulated by varying the conventional and nanolatex ratios of the conventional and nanolatexes described in TABLE 12. As can be seen from TABLE 12, the 70/30 blends did not perform as well as the 85/15 ratios. The fact that the conventional and nanolatexes have the same average particle size in both EXAMPLES 5 & 6 suggests that much of the synergy results from having the correct conventional to nanolatex particle ratio for a given ratio of conventional to nanolatex average particle sizes.

TABLE 12

Mechanical and surface properties of 70/30 conventional/nanolatex formulations.

| Mixture | Young's modulus/MPa | Area under curve (relative) | Pencil Hardness D 3363 | MEK rub resistance | Tape Adhesion X-hatch, D3359 |
|---|---|---|---|---|---|
| L0_nL0 | 5 | 24 | 2B | 15 | 5B |
| H0_nL0 | 92 | 3 | B | 20 | 4B |

TABLE 12-continued

Mechanical and surface properties of 70/30 conventional/nanolatex formulations.

| Mixture | Young's modulus/MPa | Area under curve (relative) | Pencil Hardness D 3363 | MEK rub resistance | Tape Adhesion X-hatch, D3359 |
|---|---|---|---|---|---|
| L0_nEL2 | 7 | 13 | B | 25 | 5B |
| L0_nIL4 | 9 | 5 | HB | 30 | 5B |
| H0_nIL2 | 36 | 1 | HB | 22 | 5B |
| H0_nEL5 | 62 | 1 | 3B | 25 | 5B |
| EL5_nL0 | 23 | 2 | B | 125 | 5B |
| IL4_nL0 | 16 | 7 | F | 10 | 5B |
| EH5_nL0 | 98 | 0.5 | H | 115 | 5B |

Thus, the invention provides, among other things, blends of conventional latex and nanolatex particles. Various features and advantages of the invention are set forth in the following claims.

The invention claimed is:

1. A composition comprising a mixture of nanolatex polymer particles and conventional latex polymer particles in a ratio ranging between about 3:97 and 90:10 (w/w) nanolatex particles to conventional latex particles, the nanolatex particles having an average particle size diameter of 7-30 nm, and the conventional latex particles having an average particle size diameter of 60-800 nm; wherein said nanolatex particles have been separately synthesized via microemulsion polymerization and then blended with the conventional latex particles, wherein the conventional latex, the nanolatex, or both additionally comprise co-monomers that promote crosslinking, wherein the co-monomer is selected from the group consisting 1-3-butylene glycol dimethacrylate (BGDMA), ethylene glycol diacrylate, ethylene glycol dimethacrylate, propylene glycol diacrylate, propylene glycol dimethacrylate, hexanediol diacrylate, hexanediol dimethacrylate, divinyl benzene, glycidyl methacrylate (GMA), acetoacetoxyethyl methacrylate (AAEMA), diacetone acrylamide (DAA), hydroxyethyl acrylate, hydroxypropyl acrylate, hydroxyl ethyl methacrylate, and hydroxypropyl methacrylate and mixtures thereof;
wherein the nanolatex particles or the conventional latex particles comprise a polymer which comprises at least the monomers of n-butyl acrylate (nBA) and n-butyl methacrylate (nBMA).

2. The composition of claim 1, wherein the ratio of nanolatex particles to conventional latex particles is between about 7:93 and 80:20 (w/w).

3. The composition of claim 2, wherein the ratio of nanolatex particles to conventional latex particles is between about 10:90 and 50:50 (w/w).

4. The composition of claim 1, wherein the nanolatex particles have an average particle size diameter of 15-30 nm.

5. The composition of claim 1, wherein the conventional latex particles have an average particle size diameter of 100-300 nm.

6. The composition of claim 1, wherein the nanolatex comprises at least one of n-butyl acrylate (nBA), n-butyl methacrylate (nBMA), methacrylic acid (MAA), methyl methacrylate (MMA), acrylic acid (AA), ethyl acrylate, 2-ethylhexyl methacrylate, 2-ethylhexyl acrylate, esters of acrylic acid, esters of methacrylic acids, vinyl esters, styrene, methyl styrenes, acrylonitrile, butadiene, and isoprene.

7. The composition of claim 1, wherein the conventional latex comprises at least one of n-butyl acrylate (nBA), n-butyl methacrylate (nBMA), methacrylic acid (MAA), methyl methacrylate (MMA), acrylic acid (AA), ethyl acrylate, 2-ethylhexyl methacrylate, 2-ethylhexyl acrylate, esters of acrylic acid, esters of methacrylic acids, vinyl esters, styrene, methyl styrenes, acrylonitrile, butadiene, and isoprene.

8. The composition of claim 1, further comprising a stabilizer.

9. A composition comprising a mixture of nanolatex particles and conventional latex particles in a ratio ranging between about 3:97 and 90:10 (w/w) nanolatex particles to conventional latex particles, the nanolatex particles having an average particle size diameter of 7-30 nm, and the conventional latex particles having an average particle size diameter of 60-800 nm; wherein said nanolatex particles have been separately synthesized via microemulsion polymerization and then blended with the conventional latex particles, wherein the nanolatex comprises an nBA/nBMA copolymer.

10. A composition comprising a mixture of nanolatex particles and conventional latex particles in a ratio ranging between about 3:97 and 90:10 (w/w) nanolatex particles to conventional latex particles, the nanolatex particles having an average particle size diameter of 7-30 nm, and the conventional latex particles having an average particle size diameter of 60-800 nm; wherein said nanolatex particles have been separately synthesized via microemulsion polymerization and then blended with the conventional latex particles, wherein the conventional latex comprises an nBA/nBMA copolymer.

11. The composition of claim 1, wherein the conventional latex and the nanolatex have glass transition temperatures (Tg) between about −70° C. and 120° C.

12. The composition of claim 11, wherein the conventional latex has a Tg between about 5° C. and 50° C.

13. The composition of claim 11, wherein the nanolatex has a Tg between about −15° C. and 30° C.

14. The composition of claim 1, wherein the ratio of the average particle size of the conventional latex to the average particle size of the nanolatex is between about 3:1 to about 20:1.

15. The composition of claim 1, wherein the average particle size of the conventional latex is about six times larger than the average particle size of the nanolatex, and the composition comprises about 20-30 nanolatex particles for each conventional latex particle.

16. The composition of claim 1, wherein the average particle size of the conventional latex is about seven times larger than the average particle size of the nanolatex.

17. The composition of claim 1, wherein the average particle size of the conventional latex is about five times larger than the average particle size of the nanolatex, and the composition comprises about 10-20 nanolatex particles for each conventional latex particle.

18. A latex blend comprising a composition of claim 1.

19. A paint comprising a composition of claim 1.

20. An adhesive comprising a composition of claim 1.

21. A composition comprising a mixture of conventional latex particles and nanolatex polymer particles in a weight ratio ranging between about 80:20 and about 90:10 of conventional latex polymer particles to nanolatex polymer particles, the conventional latex polymer polymerized from nBA, nBMA, and MAA monomers, and having a Tg between about 20° C. and 35° C.; the nanolatex polymer polymerized from nBA, nBMA, and MAA monomers, and having a Tg between about 0° C. and 15°;

wherein the conventional latex, the nanolatex, or both additionally comprise co-monomers that promote crosslinking, wherein the co-monomer is selected from the group consisting 1-3-butylene glycol dimethacrylate (BGDMA), ethylene glycol diacrylate, ethylene glycol dimethacrylate, propylene glycol diacrylate, propylene glycol dimethacrylate, hexanediol diacrylate, hexanediol dimethacrylate, divinyl benzene, glycidyl methacrylate (GMA), acetoacetoxyethyl methacrylate (AAEMA), diacetone acrylamide (DAA), hydroxyethyl acrylate, hydroxypropyl acrylate, hydroxyl ethyl methacrylate, and hydroxypropyl methacrylate and mixtures thereof.

22. A latex blend comprising a composition of claim 21.

23. A paint comprising a composition of claim 21.

24. An adhesive comprising a composition of claim 21.

25. The composition of claim 1, wherein the nanolatex particles have an average particle size of 7-25 nm.

26. A composition comprising a mixture of conventional latex particles and nanolatex particles in a weight ratio ranging between about 80:20 to about 90:10 conventional latex particles to nanolatex particles, the conventional latex comprising nBA, nBMA, and MAA monomers, and having a Tg between about 20° C. and 35° C.; the nanolatex comprising nBA, nBMA, and MAA monomers, and having a Tg between about 0° C. and 15° C.;

wherein the nanolatex particles have been separately synthesized via microemulsion polymerization and then blended with the conventional latex particles, and wherein the nanolatex particles have an average particle size of 7-25 nm.

27. The composition of claim 1, wherein the nanolatex particles have a Gaussian particle diameter distribution with a sigma of ±15 percent.

28. The composition of claim 21, wherein the nanolatex particles have a Gaussian particle diameter distribution with a sigma of ±15 percent.

* * * * *